United States Patent [19]

Boxall

[11] 3,876,838

[45] Apr. 8, 1975

[54] CARRIER CONCENTRATOR SYSTEM AND METHOD

[75] Inventor: Frank S. Boxall, Woodside, Calif.

[73] Assignee: Vidar Corporation, Mountain View, Calif.

[22] Filed: Oct. 26, 1973

[21] Appl. No.: 410,205

[52] U.S. Cl. ... 179/15 BW; 179/15 BA; 179/15 BV

[51] Int. Cl. ... H04j 3/16

[58] Field of Search ...... 179/15 BA, 15 BW, 15 BV, 179/15 AS, 15 AL

[56] References Cited

UNITED STATES PATENTS

| | | | |
|---|---|---|---|
| 3,529,089 | 9/1970 | Davis | 179/15 AL X |
| 3,591,722 | 7/1971 | Palsa | 179/15 BA |
| 3,804,990 | 4/1974 | Costa | 179/15 BW X |

*Primary Examiner*—Ralph D. Blakeslee

[57] ABSTRACT

A carrier telephone system useful in serving a large number of subscribers by delta modulation over a digital transmission facility having a predetermined bit rate capacity. The system comprises a central office control terminal, one or more remote terminals and an interconnecting digital transmission facility. The subscribers are connected to the remove terminals by wire pairs. The control terminal interfaces with the central office switching machine and provides a line appearance for each subscriber connected to the remote terminal and controls the assignment of transmission channels to active subscribers. The system includes a full access non-blocking concentration switching subsystem. The system provides for a normal mode of operation where a fixed number of transmission channels are available for assignment to active subscribers. In this mode the transmission channels operate at a fixed bit rate. When all transmission channels have been assigned to subscribers, the system operates in an elastic mode which adds or deletes additional transmission channels as required by the subscriber traffic. As transmission channels are added or deleted while in the elastic mode, the bit rate for all transmission channels changes accordingly. The carrier concentrator system and method is also useful in providing interoffice telephone trunks between a hub central office and one or more tributary offices.

47 Claims, 24 Drawing Figures

NOTE: M INPUTS (DOTTED) ARE FROM REFRAME LOGIC

N = NORMAL BIT STREAM
RI = REPEATED 1'S
A = ALTERNATING BIT STREAM
RC = ROLL CALL

CARRIER CONCENTRATOR SYSTEM AND METHOD

BACKGROUND OF THE INVENTION

This invention relates generally to a digital time division multi-channel carrier system employing concentration switching and more particularly to a carrier system having full access, non-blocking concentration switching in which the number of transmission channels is adjustable to meet traffic demand and as the number of transmission channels changes, their bit rate varies in accordance with the number of active sources. The system is particularly adaptable to subscriber carrier applications.

Digital time division multiplex communication systems for transmitting information from a plurality of sources from one location over a digital transmission medium to another location have included a dedicated transmission channel for each of the information sources. Each of the transmission channels serves to carry digital information representative of the information to be transmitted. In such systems the channels are arranged in groups or frames with each channel occupying a time slot in a frame. One or more additional time slots may be provided to carry framing and control information.

The number of channels which can be accommodated in any digital transmission medium is determined by the bit rate capacity of the transmission medium and the channel bit rate required to obtain the desired transmission quality. Thus, with dedicated channels, the number of information sources which can be accommodated is limited to the number of transmission channels. To overcome this limitation, so-called concentration type communication systems have been developed. In such systems, the number of information sources which can be accommodated exceeds the number of transmission channels available. Control means assign the transmission channels to the information sources on demand. When all available transmission channels are in use, the system cannot accommodate additional information sources and additional service requests are denied.

Below this ultimate limit, there may be a traffic restriction due to the characteristics of the concentrator switch. Unless the switch is non-blocking, it may be impossible for a requesting information source to access an avilable transmission channel because of congestion within the switch due to existing traffic. Thus, the ultimate traffic capacity is achieved only when the concentration switch is a non-blocking switch, which permits any requesting information source to access any available transmission channel, regardless of the existing traffic pattern.

Digital time division multiplex communication systems have been widely applied in the telephone industry for transmitting messages from one location to another. One particular application of such systems has been in rural subscriber carrier systems where a central office serves a large number of rural subscribers. Originally wire pairs connected the central office to each of the subscribers. However, when distances became sufficiently long to make the cost of wires uneconomical, multi-channel digital message transmission systems were employed. The early systems used one transmission channel dedicated to each subscriber whereby the number of subscribers were limited by the fixed bit rate of the transmission facility and the required channel bit rate. More modern systems economize by concentrator switching which serves a large number of subscriber channels on a smaller number of transmission channels. Such systems have a fixed number of transmission channels and can only accept traffic up to the system limit and then deny service to additional subscribers. If the concentration switch is not of the non-blocking type, the traffic capacity of the systems is less than the ultimate capacity determined by the total number of transmission channels.

OBJECTS AND SUMMARY OF THE INVENTION

It is a general object of the present invention to provide an improved digital time division multiplex information transmission system.

It is another object of the present invention to provide an improved delta modulation multi-channel carrier system.

It is a further object of the present invention to provide a carrier system which automatically adds and subtracts transmission channels responsive to service requests whereby the number of active transmission channels corresponds to the number of active sources.

It is a further object of the present invention to provide a digital time division multiplex subscriber carrier system which operates over a transmission medium having a fixed bit rate in which the system automatically adds and subtracts transmission channels responsive to service requests by subscribers so that the number of transmission channels corresponds to the number of active subscribers and the bit rate and quality for each transmission channel varies with the number of active subscribers.

It is still another object of the present invention to provide an improved full access, non-blocking concentration switching system.

It is still a further object of the present invention to provide a delta modulation multi-channel subscriber carrier system in which a large number of subscribers are served over a transmission medium having a fixed bit rate by concentrating a large number of subscriber channels into a smaller number of transmission channels transmitting at bit rates corresponding to the number of active subscribers.

The foregoing and other objects of the invention are achieved by a carrier system providing time division multiplex transmission between a control terminal connected to the central office and one or more remote terminals. The system includes means for scanning the status of the source lines at the remote terminals and the line appearances at the central office to determine when a source has become active or idle, and then automatically adding or deleting a transmission channel to accommodate the change in active sources. The carrier system is particularly useful where the sources are subscribers but is also useful where the sources are interoffice trunks.

DESCRIPTION OF PREFERRED EMBODIMENT

General

Figure 1:
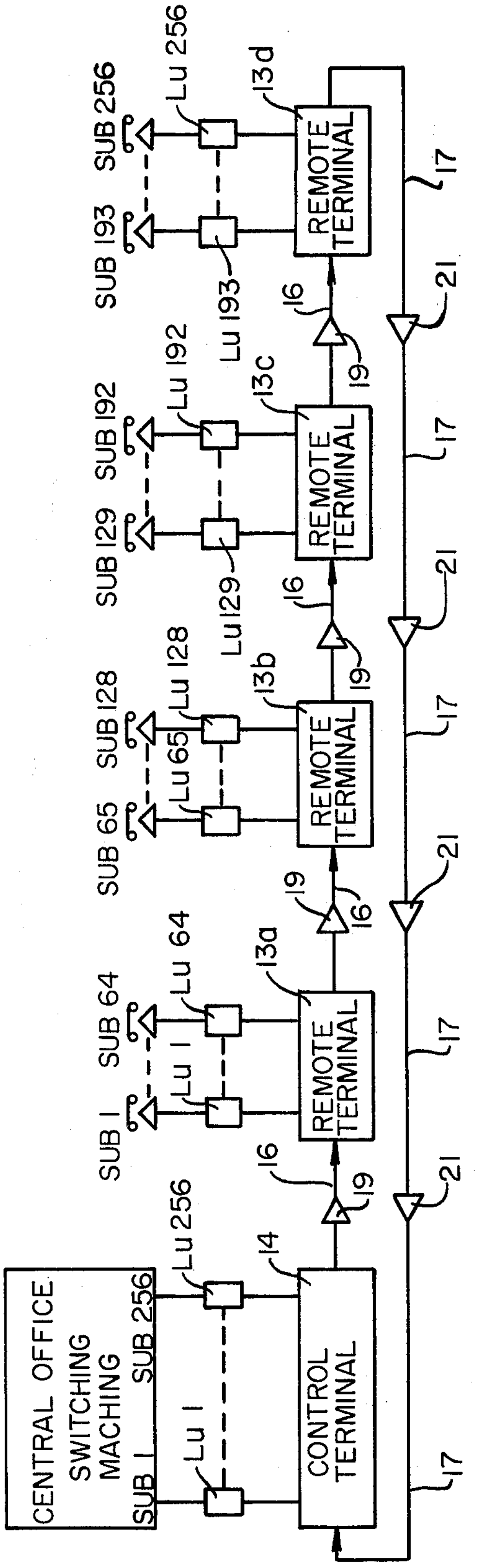
FIG. 1 is a schematic block diagram showing a subscriber carrier system incorporating the invention.

FIG. 1 shows a subscriber carrier system which is adapted to serve a plurality of subscribers SUB-1 – SUB-256 connected by a line unit LU-1 – LU-256 to an associated remote terminal 13*a–d*. The system shown includes four remote terminals each associated with sixty-four subscribers. It will be apparent from the description to follow that the system can work with a single remote terminal or with any number of remote terminals. A control terminal 14 located at the central office is connected to a plurality of line units LU-1 – LU-256 which, in turn, are connected to subscriber line appearances SUB-1 – SUB-256 as indicated. The control terminal serves to provide a transmission channel for each subscriber who seeks service or who is called so that he can communicate over the transmission medium. The transmission facility or medium may comprise a oneway line 16 connected between the control terminal and the first remote terminal 13*a* and between the remote terminals 13*a–d* and one-way line 17 connected between the last remote terminal and the control terminal. The lines may be digital lines of the T1 repeatered type which include a number of regenerative pulse repeaters 19 and 21. More specifically, the plurality of remote subscriber lines identified as SUB-1 – SUB-256 are connected in groups of 64 to the remote terminals 13*a*, 13*b*, 13*c* and 13*d* through the line interface units LU-1 – LU-64, LU-65 – LU-128, LU-129 – LU-192 and LU-193 – LU-256, respectively. At the telephone central office corresponding line appearances identified as SUB-1 – SUB-256 are connected by line interface units LU-1 – LU-256 to the control terminal 14. Each line interface unit contains an encoder which converts speech and signalling information on the analog side of the line interface unit into digital signals for outgoing transmission over a digital transmission channel. Each line interface unit also contains a decoder which converts digital information from an incoming transmission channel into speech and signalling information on the analog side of the line interface unit. The line units also include means for converting dialing and ringing signals for transmission between subscriber lines and central office line appearances.

The transmission channels are assembled and distributed by time division multiplexing and demultiplexing in which each active line is served by providing a transmission channel to complete the circuit between the subscriber line at a remote terminal and the corresponding line appearance at the control terminal. At each remote terminal and at the control terminal a line memory contains one cell for each subscriber line and these cells are logically marked zero or one according to whether the corresponding line is active or idle. The local memory at the remote terminals is configured to correspond to that of the control terminal whereby in normal operation all of the local memories, control and remote, are identically configured.

The control terminal outgoing bit stream is organized in message frames by the control terminal multiplexing system which selectively scans the delta encoders of those lines which are marked active in the local memory but skips over those lines which are marked idle, thereby generating repetitive frames of time slots in which each time constitutes a transmission channel for an active line. The demultiplexing of incoming frames is similarly controlled by the same local memory.

The number of message or transmission channel time slots per frame is equal to the number of active lines and increases by one whenever an idle line becomes active or decreases by one whenever an active line becomes idle. In addition to transmission channel time slots, each frame includes one time slot for system control purposes and one for frame identification.

Figure 2:
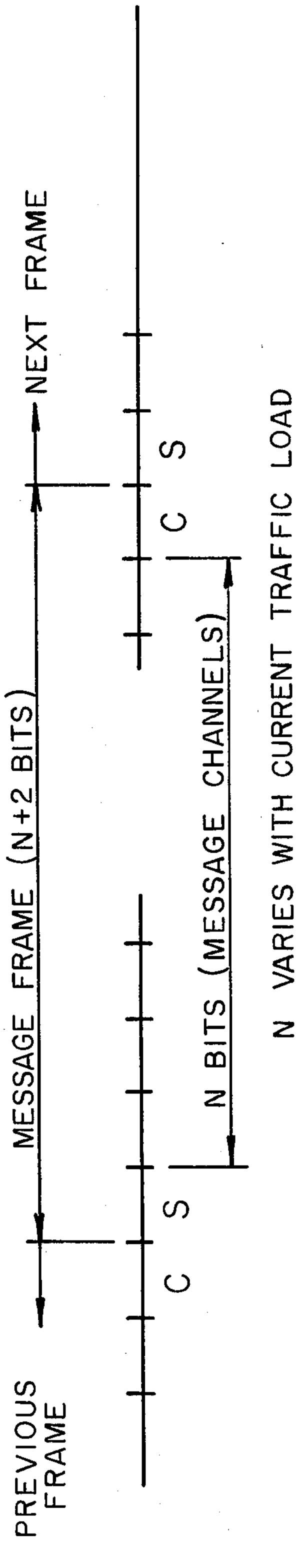
FIG. 2 illustrates a typical message frame.

A message frame comprises N+2 bits and is schematically shown in FIg. 2. The first bit is an S bit which contains system framing information. The first bit is normally 1, except during traffic change instructions or during system reframing. The last bit is a C bit and contains system control information, to be presently described. Finally, the frame includes N interior bits with each bit constituting one message channel to complete a talking cicuit between an active subscriber and his central office line appearance. The number of interior bits N will be equal to the number of active subscribers and will increase by one whenever an idle subscriber becomes active, or decrease by one whenever an active subscriber becomes idle.

It will be apparent that the number of bits N which can be handled over a transmission facility of fixed bit rate employing delta modulation will be limited. By way of example, assume the digital transmission facility is a T1 line which has a bit rate 1,544 Mb/s, rounded out to 1,600 Kb/s. For N+30, a frame is 32 bits. The frame rate, hence messaged channel bit rate, is 50 Kb/s. This provides a good quality delta modulation speech circuit.

For N=62, the frame is 64 bits. The frame rate, hence message channel bit rate, is 25 Kb/s. This provides a degraded but adequate quality delta modulation speech circuit.

For N greater than 62, the message channel bit rate is less than 25 Kb/s and the speech circuit quality is further degraded. To prevent this, a maximum load circuit may be provided so that when N reaches 62, the system denies service to additional requests. In this condition, when an active line becomes idle, N decreases to 61 and the next request for a message channel is granted.

For N less than 30, the message channel bit rate would be greater than 50 Kb/s, and the speech circuit quality would improve accordingly. This may be quite acceptable, or it may be undesirable because of excessive contrast between speech circuit quality for light traffic conditions (N much less than 30) and nominal traffic conditions (N equal 30). To prevent contrast effects, a minimum frame counter may be provided such that when the number of active subscribers is less than 30, the frame length is maintained at 32 bits. For example, if only five subscribers are active, the first five interior bits of the frame constitute the five message channels and the following 25 interior bits are simply fill bits which extend the frame length to the nominal 32 bits. These 25 fill bits carry no useful information. During reframing the system adopts a two bit frame mode.

In the explanation of signal flow and system control to follow, reference is made to subscriber number 83. Assume subscriber No. 83 (SUB-83) is active and that his message transmission channel is provided by the 12 interior bit of the frame. Speech information from central office (C.O.) line appearance SUB-83 passes through line unit No. 83 (LU-83) and is converted to digital form. The digital signal information is multiplexed into interior bit slot No.12 and transmitted outgoing from the control terminal. A suitable switching system for multiplexing the signal information will be described. The digital signal information passes through remote terminal 13*a* unaltered and arrives at remote terminal 13*b*. Here it is demultiplexed from the incoming bit stream and directed to LU-83 where it is decoded to analog form and transmitted to subscriber SUB-83.

Speech information from SUB-83 passes through LU-83 and is converted to digital form. This digital information is multiplexed into interior bit slot No.12 and transmitted outgoing from remote terminal 13*b*. It passes through remote terminals 13*c* and 13*d* unaltered and arrives at the control terminal 14. Here it is demultiplexed from the incoming bit stream and directed to LU-83 where it is decoded to analog form and transmitted to C.O. line appearance SUB-83.

In the direction from control terminal to remote terminal, the control channel is used to configure the local memory at the remote terminals to be identical to that at the control terminal. In the direction from remote terminal toward control terminal, the control channel carries a low speed, sequential scan of the status (on-hook or off-hook) of all subscriber lines at the remote terminals. At the control terminal, a corresponding low speed scanning system examines the central office line appearances for status information. These two scans are combined to provide information as to when an idle line becomes active or when an active line becomes idle. When such a status change is detected, the control terminal instructs the remote terminals via the control channel as to which local memory cell is to be changed and the nature of the change, i.e. add a channel to frame or delete a channel from the frame. The terminals change their local memory and adopt a new frame configuration without misframing.

In the event of an inadvertent misframe of the system, all terminals revert to a fixed frame length, in one example, two bits, and reframe in this configuration. As soon as reframe is confirmed, the control terminal reads out the content of its local memory towards the remote terminals which load their local memories accordingly. Then all terminals adopt the normal frame structure.

Line Interface Units

Figure 3:
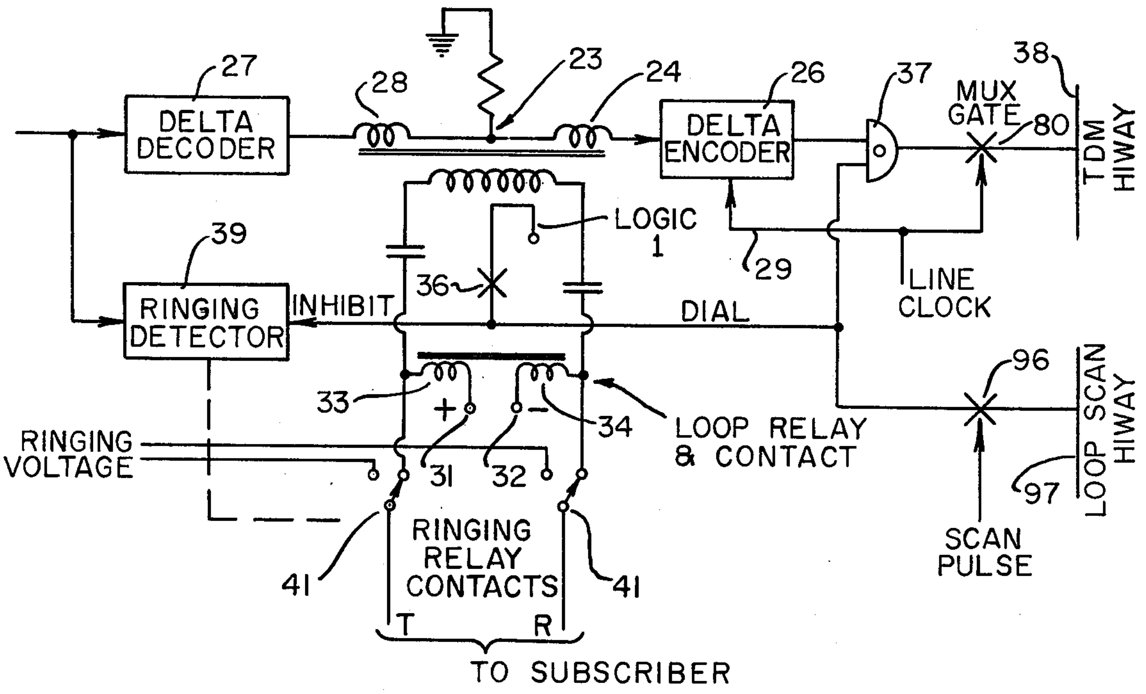
FIG. 3 is a diagram of a remote terminal line unit.

FIG. 3 shows a line interface unit (LU) for use at the remote terminal. The subscriber line comprises a pair of wires designated T (trip) and R (ring) which extend from the line interface unit to the subscriber telephone instrument. There is one line interface unit for each subscriber served by the system. The primary function of the line interface unit is to convert speech signals to digital form, and vice versa. Secondary functions involve dialing toward the central-office and ringing toward the subscriber.

Transmission between subscriber and remote terminal is bidirectional on the line pair T and R. A hybrid transformer 23 converts the two-wire bidirectional transmission path into two uni-directional transmission paths. On the uni-directional side of the hybrid the transmitting path 24 directs subscriber speech signals to a delta modulation encoder 26 which converts them to digital form for outgoing transmission. On the receiving side, incoming digital signals are converted to speech by the delta modulation decoder 27 and applied to the receiving path 28 of the hybrid transformer.

The encoder 26 in each line interface unit is clocked by the corresponding line clock pulse *c* on the line 29.

On the line side of the hybrid transformer, talking battery is fed to the subscriber instrument via terminals 31 and 32 through the balanced windings of high impedance retard coil 33 and 34. The coil also activates a loop relay contact 36. When the telephone instrument in on-hook, no current flows in the subscriber loop and the loop relay contact is released. When the telephone instrument is off-hook, current does flow in the subscriber loop and the loop relay contact is operated.

It is a fundamental property of delta modulatiaon that the encoder cannot generate sustained separation of like bits, i.e. logic 0 or logic 1. Because of this, it becomes possible to transmit dialing and ringing signals over the DM bit stream. Dialing by an off-hook subscriber causes the loop relay contact 36 to release and operate in synchronism with the dial pulses (a sequence of on-hook intervals, typically 50 milliseconds per interval) generated at the instrument. In the released condition the loop relay contact applies logic 1 to the OR gate 37 at the encoder output, providing a continuous sequence of logic 1 to the TDM highway 38. This sequence lasts for the duration of the dial pulse. At the far end decoder, a detector responds to the sustained sequence of logic 1 and operates relay contacts which repeat the dialing toward the central office. The far-end detector discriminates between the long sequences corresponding to dial pulsing and the shorter sequences which may occur incidentally in the course of the normal DM encoding process.

Similarly, subscriber ringing signals originating at the central office are forwarded over the DM bit stream as sustained sequences of like bits. A ringing detector 39 in the remote terminal line unit detects these and operates a ringing relay whose contacts 41 connect the subscriber line to a local source of ringing voltage during the ringing interval. The ringing detector may be designed to discriminate between the long sequences corresponding to ringing intervals and the shorter sequences which may occur incidentally in the course of the normal DM encoding process. When the subscriber is off hook, the loop relay contact 36 is closed. Logic 1 is applied to the ringing detector to inhibit the ringing detector so that the system cannot ring an off hook subscriber.

Figure 4:
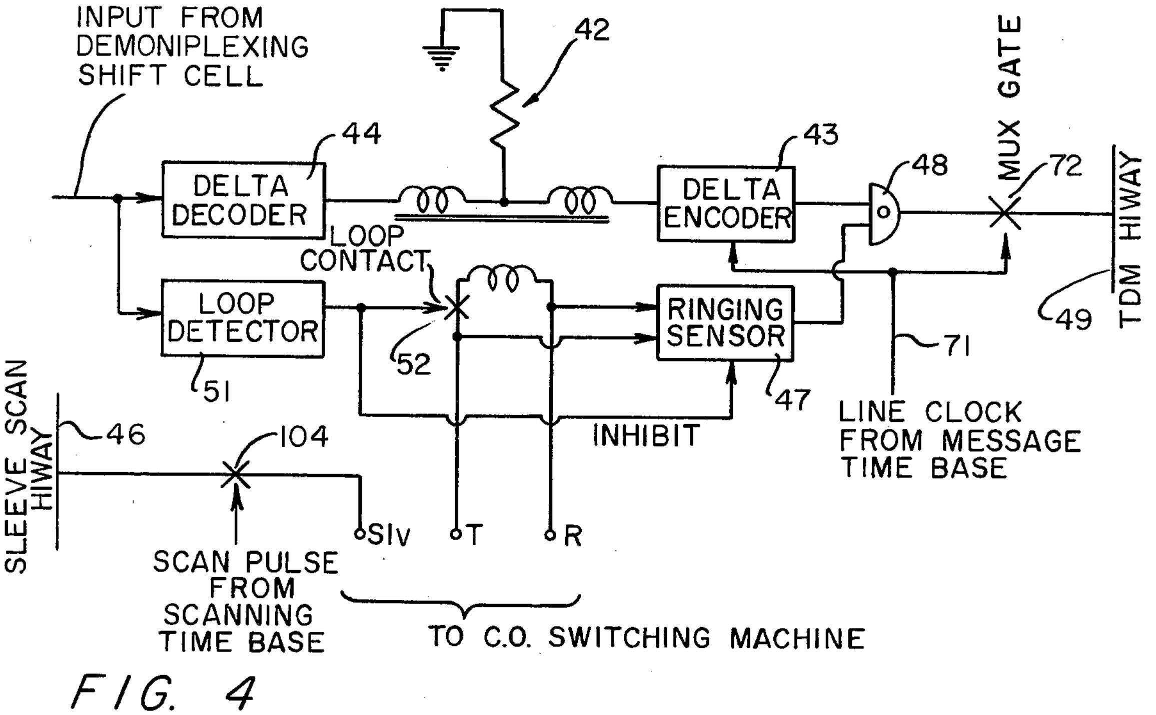
FIG. 4 is a diagram of a control terminal line unit.

FIG. 4 shows a line interface unit for use at the control terminal. There is one such unit for each subscriber served by the system. The line interface unit connects to the T (tip), R (ring) and Slv (sleeve) leads of the subscriber line appearance at the central office switching machine. In conventional telephone practice (i.e. without the interposition of the carrier-concentrator system), the tip and ring leads at the central office would be connected directly to the subscriber telephone instrument by a pair of wires. They carry speech signals and dialing and ringing signals by two-wire bidirectional transmission. The sleeve lead is a control lead within the central office switching machine. The sleeve lead is off-ground when the subscriber line is idle. It is connected to ground by the switching machine whenever the subscriber goes off-hook to originate a call, or whenever the switching machine connects to the subscriber pair (tip and ring) to complete a call.

Operation of the line interface unit at the control terminal is very similar to that described for the remote terminal. In particular, the operation of the hybrid transformer 42 and the DM encoder 43 and DM decoder 44 are identical.

In the control terminal line unit a sleeve scanning subsystem in the control terminal scans the sleeve status of all lines periodically to derive information as to line status and multiplexes the information on the sleeve scan highway 46. Operation of this subsystem is described in the section on system control functions.

The ringing sensor 47 is bridged across tip and ring lines to detect when ringing voltage is applied to the pair by the switching machine. Presence of ringing voltage provides logic 1 to the input of the OR gate 48 at the encoder output so that a ring interval causes a continuous sequence of logic 1 to the TDM highway 49. The ringing detector at the remote terminal line interface unit responds as previously described.

In the remote line unit, the loop open condition for an active line was encoded by a continuous sequence of logic 1 to the transmission channel. Correspondingly, in the control terminal line unit, a loop detector 51 responds to a continuous sequence of logic 1. The loop detector discriminates between the long sequences corresponding to dial pulsing and the shorter sequences which may occur incidentally in the course of the normal DM encoding process. The loop detector operates a loop contact 52 which repeats the state of the subscriber loop toward the central office switching machine. The loop contact is closed only when the line is active and the incoming bit stream is mixed. If the line is idle, or if the bit stream is a continuous sequence of logic 1, the loop contact is open. When a subscriber is off hook, the loop detector generates an inhibit signal which is applied to the ringing sensor. This prevents ringing an off hook subscriber.

Time Base

Figure 5:
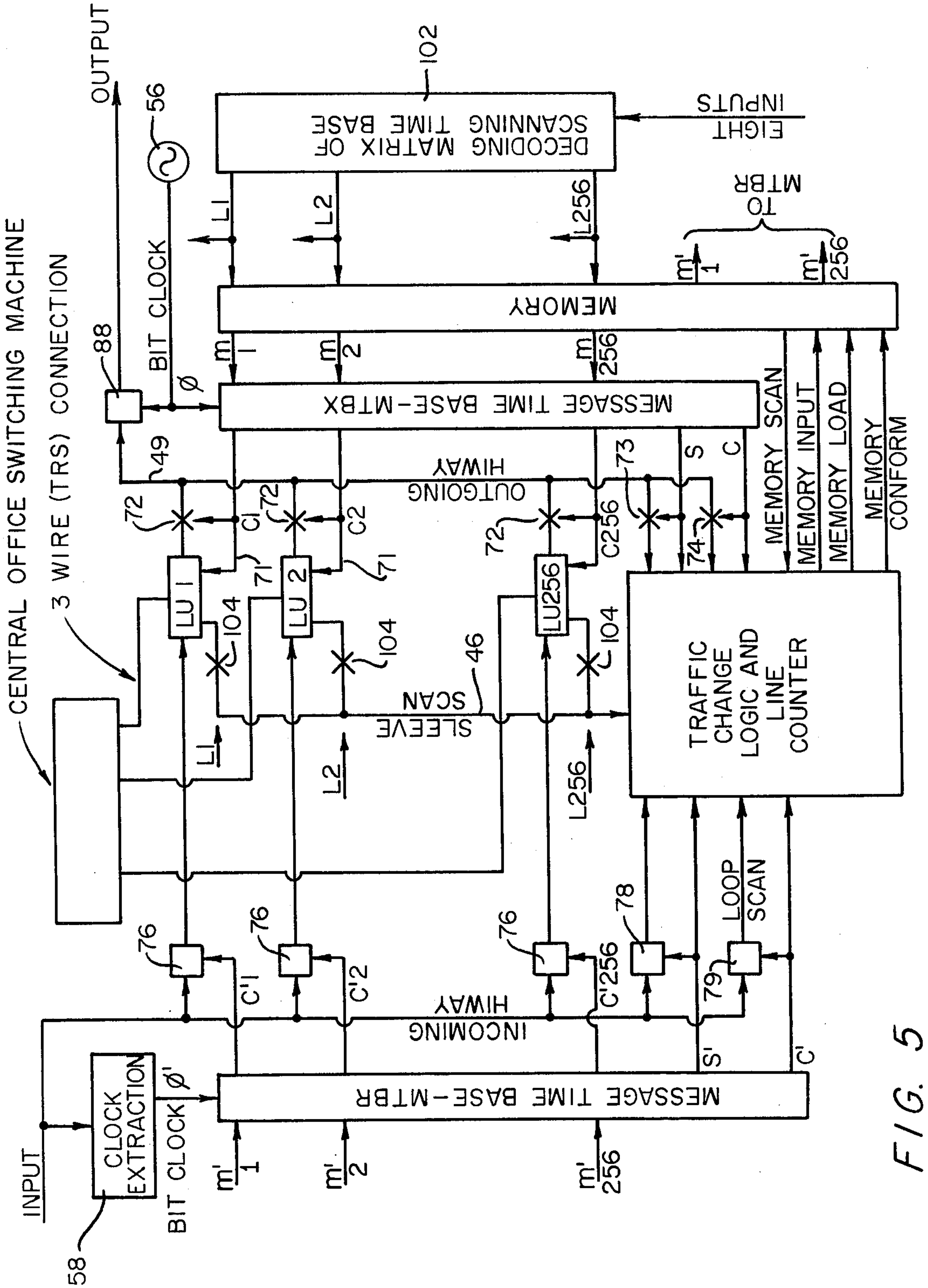
FIG. 5 is a block diagram of the control terminal.

The control terminal, FIG. 5, includes two message time bases, MTB, one for transmitting (multiplexing), MTBX, of information bits into outgoing frames, and one for receiving (demultiplexing), MTBR, of information bits from incoming frames. Each remote terminal, FIG. 6, contains a message time base, MTB, which generates timing pulses to control the multiplexing of information bits into outgoing frames and the demultiplexing of information bits from incoming frames.

Each time base is driven by a bit clock which provides a square wave of 1600 Kb/s. At the control terminal, the transmitting bit clock is provided by a local oscillator 56. This is the master bit clock for the whole system. At each remote terminal and at the receiving side of the control terminal, the bit clock is extracted from the incoming bit stream by clock extractors 57 and 58 respectively. This ensures bit synchronism throughout the system.

Each message time base is controlled by 256 inputs *ml* – *m*256 from a local memory. Each cell of the memory corresponds to a subscriber line and is marked 0 if the subscriber is idle, 1 if the subscriber is active.

Figure 7:
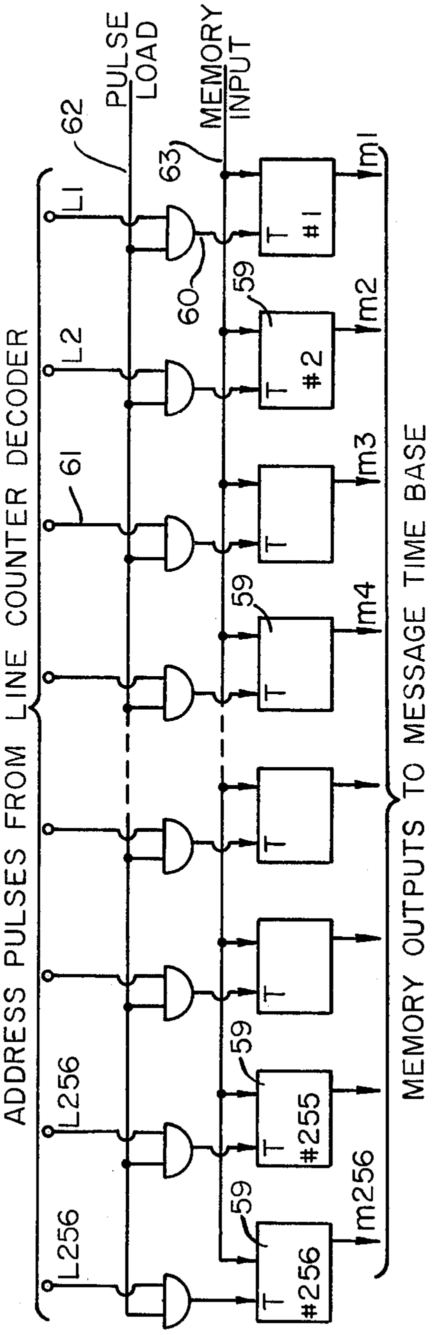
FIG. 7 is a block diagram of a remote terminal local memory.

The remote terminal local memory is shown in FIG. 7. The memory includes a plurality of memory cells 59, one for each subscriber 1 through 256. The logic state, output logic 1 or logic 0, of each memory cell can be changed only if the corresponding address lead 61 from the line counter decoder is logic 1 and the load lead 62 is logic 1. For this condition, the memory cell adopts the logic state present on the memory input lead 63. The memory cells 50 operate responsive to a logic 1 input on line 60 to provide a logic 1 or logic 0 output corresponding to the logic state of the memory input on line 63.

Figure 8:
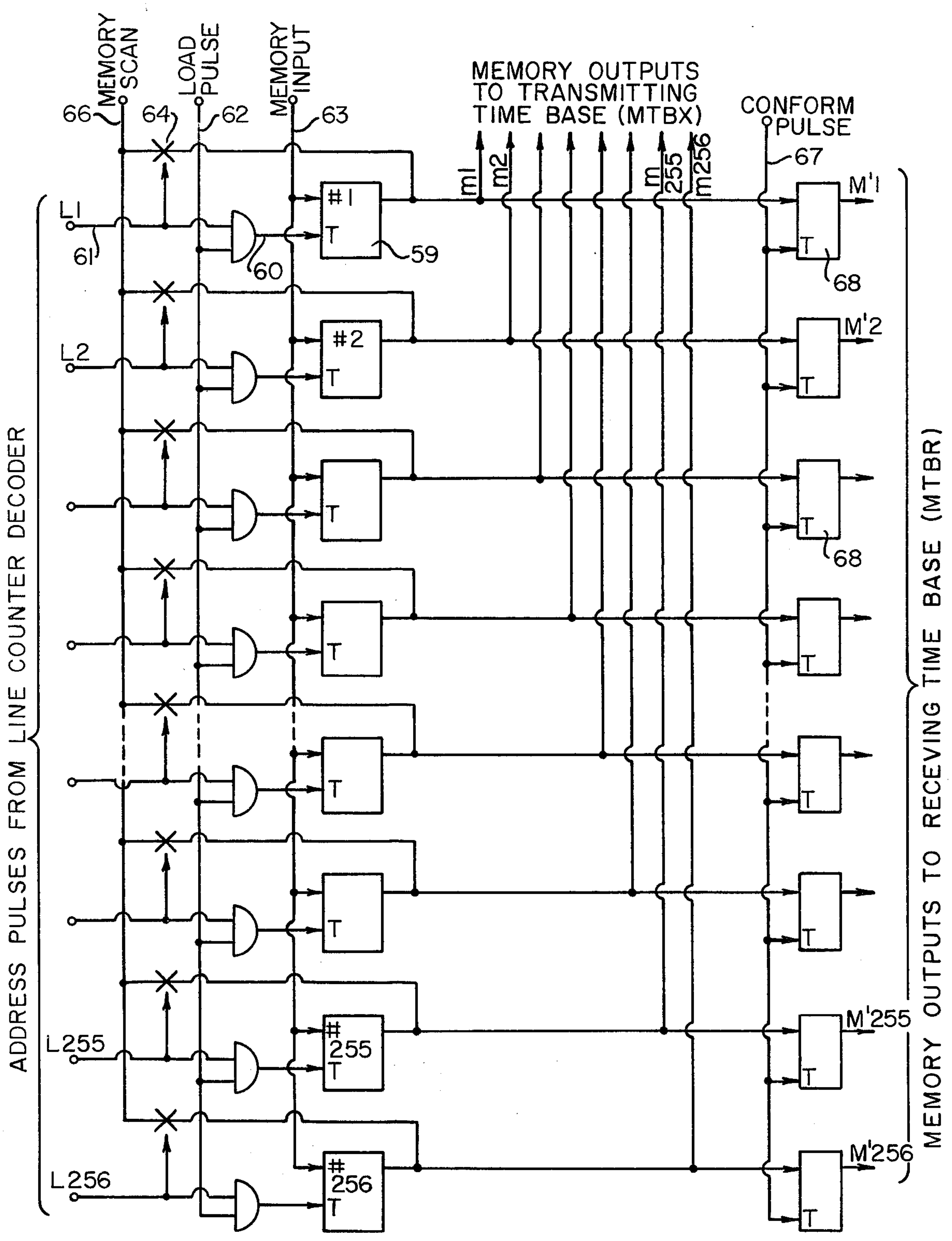
FIG. 8 is a block diagram of the control terminal local memory.

The local memory at the control terminal has two ranks of memory, each with 256 cells. The first rank provides inputs to the MTBX and the second rank provides inputs to the MTBR. The control terminal local memory is shown in FIG. 8. The elements on the left side form the first rank and are identical to FIG. 7. In addition, the output of each memory cell 59 is connected through a transmission gate 64 to a memory scan highway 66. Transmission gates 64 are operated when the corresponding address lead is logic 1. The elements on the right form the second rank of memory. When the conform lead 67 is logic 1, every memory cell 68 in the second rank adopts the same logic state as the corresponding memory cell 59 in the first rank. Thus, a pulse on the conform lead will cause the entire second rank to conform to the first rank.

In normal operation, all local memories are identically marked with the current traffic pattern of lines idle and lines active. When the traffic pattern changes, all memories will be altered in sequential synchronism by means of instructions transmitted from the control terminal on outgoing S and C bits.

The transmit message time base MTBX, FIG. 5, has an output lead S, an output lead C, and 256 line clock leads *c*1 to *c*256. The receive time base MTBR has an output lead S', an output lead C', and line clock leads *c'*1 to *c'*256. The remote terminal time bases include S and C output leads and line clock leads as follows:

Remote terminal

No. 1: line clock leads c1 to c64

No. 2: line clock leads c65 to c128
No. 3: line clock leads c129 to c192
No. 4: line clock leads c193 to c256

However, at each remote terminal, the local memory must be complete, containing 256 cells 59 and 256 outputs.

In one cycle (frame) of operation the MTB generates in time sequence: (a) one S pulse on lead S; (b) one line clock pulse *c* on each line clock lead for which the input from the local memory is marked logic 1, the time order of the line clock pulses corresponds to the numerical order of the logic 1 inputs from the local memory; and (c) one C pulse on lead C. Each pulse lasts one time slot and the total interval (frame) lasts N+2 time slots where N is the number of logic 1 inputs from local memory. The MTB does not generate line clock pulses on the line clock leads for which input from local memory is marked logic 0.

At the control terminal, each line clock lead 71 of the MTBX is connected to the delta modulation encoder 43 of the corresponding line unit LU-1 – LU-256, FIGS. 4 and 5, to provide clock pulses to the encoder 43 when the subscriber line is active. Also, each line clock lead 71 is connected to the control input of a transmission gate 72 connected between the digital output of the corresponding line unit and the outgoing highway 49. Thus, the line clock pulses operate the gates sequentially to provide time division multiplexing of digital information from the active line units to the highway for outgoing transmission. In addition, leads S and C of the MTBX are connected to corresponding transmission gates 73, 74, FIG. 5, thereby providing for the multiplexing of framing and control information into S and C time slots on the outgoing highway 49.

At the control terminal, each line clock lead *c*′1–*c*′256 of the MTBR is connected to the clock terminal of a shift cell 76 whose input terminal is connected to the incoming highway 77 and whose output connects to the digital input to the decoder 44 of the corresponding line unit. The timing pulses of the MTBR are frame synchronous with the incoming bit stream. As the line clock pulse rises, it clocks the current bit on the incoming highway to the output terminal of the shift cell 76. This bit is held at the output terminal until the same clock pulse occurs in the next frame. Thus, the line clock pulses of the MTBR provide sequential demultiplexing of digital message channels from the incoming highway to active line units.

In addition, lead S′ and C′ of the MTBR are connected to corresponding shift cell 78, 79 to demultiplex incoming framing and control information from the incoming S and C time slots.

Figure 6:
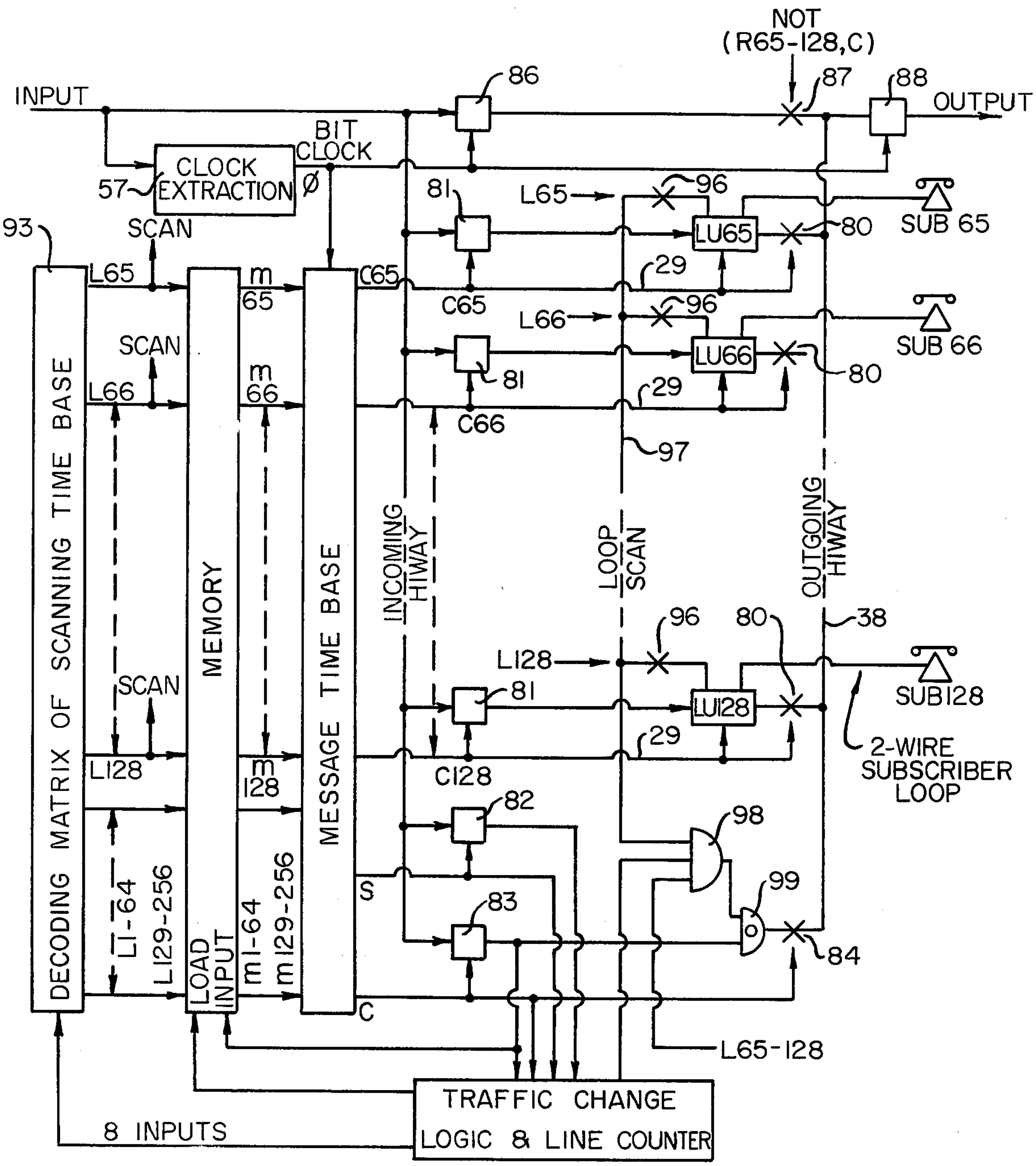
FIG. 6 is a block diagram of a remote terminal.

At each remote terminal, FIG. 6, a single MTB serves for both demultiplexing and multiplexing. Each line clock lead provides *c* pulses to the corresponding line unit encoder 26, multiplexing transmission gate 80, and demultiplexing shift cell 81. The timing pulses of the message time base are frame synchronous with the incoming bit stream.

In addition, leads S and C are connecting to corresponding shift cells 82, 83 to demultiplex framing and control information from the incoming S and C time slots. Lead C is also connected to a transmission gate 84 to provide for multiplexing of loop scan information from the remote terminal into C time slots on the outgoing highway 38. At each remote terminal, only 64 subscribers are connected. Therefore, it is necessary to provide only one set of 64 line clock leads. The remaining 192 line clock leads are omitted.

At the remote terminal, message channels not assigned to any of the 64 subscriber lines corresponding to the terminal are repeated through the terminal unaltered. Framing information contained on S bits is also repeated unaltered. This is accomplished by repeating all incoming bits through a shift cell 86 clocked by bit clock, to a transmission gate 87 connected to the output highway. The transmission gate 87 is operated whenever the message time base is not generating pulses on the C lead or on any of the 64 line clock leads. This operating pulse is easily derived from the internal circuitry of the message time base. Alternatively, it can be derived as the inverse of the logical OR function of pulses on the C lead and 64 line clock leads of the terminal.

At each terminal, the outgoing bit stream is repeated through the shift cell 88, clocked by bit clock in order to remove ambiguities which might result from incidental overlap of timing pulses or whatever.

Scanning time Bases

Figure 9:
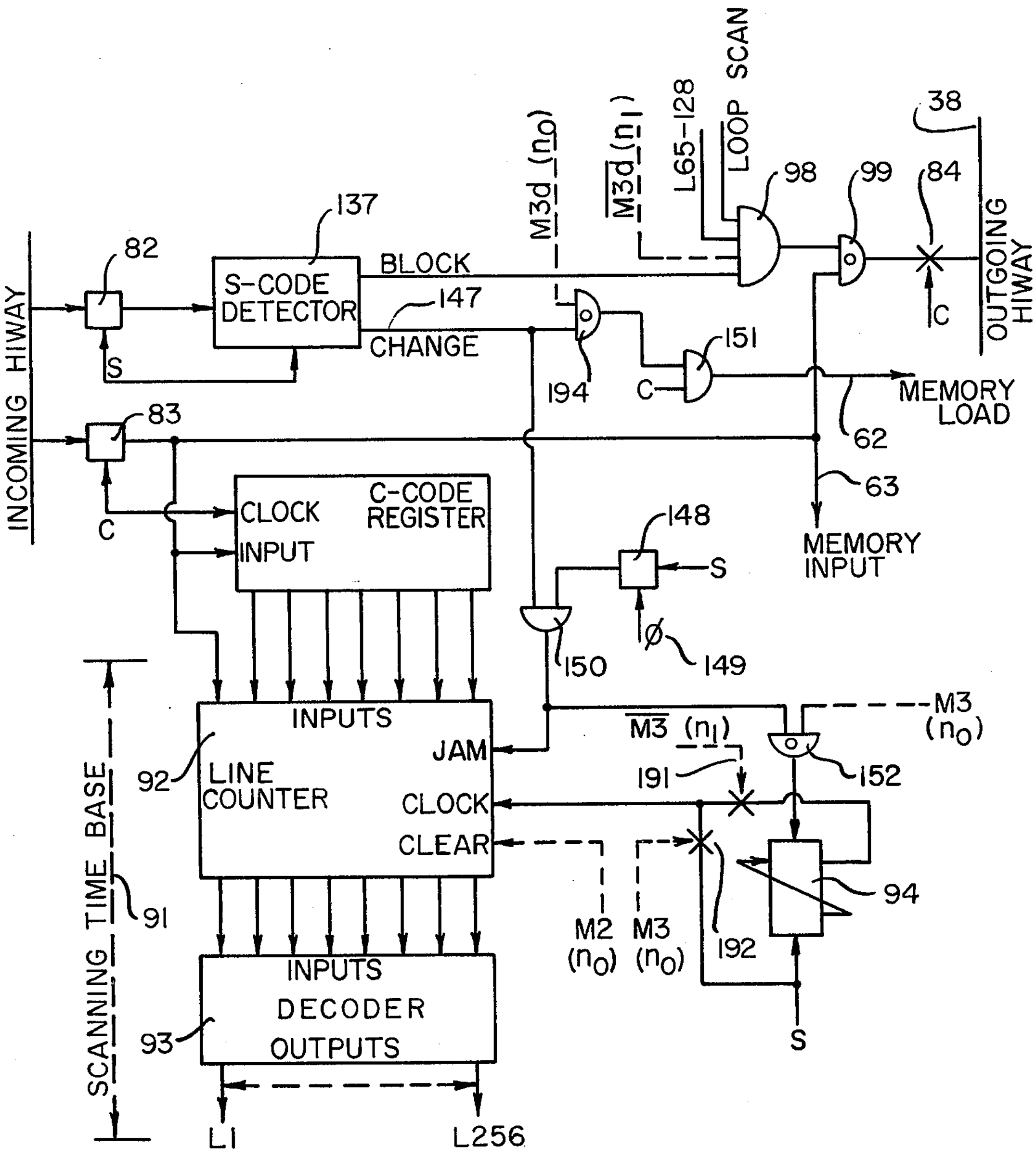
FIG. 9 shows the traffic change logic of a remote terminal.

At each remote terminal, there is a scanning time base 91, FIG. 9, which is used to acquire information as to the status of each subscriber line and forward this information to the control terminal for processing.

The scanning time base consists of an eight stage binary line counter 92 and decoding matrix 93, FIGS. 6 and 9. The line counter is clocked by binary divider 94 and advances one count on every second S pulse. As the line counter 92 proceeds through its 256 binary states, it produces pulses on the 256 output leads, L1 to L256, of the decoding matrix 93. These pulses are generated sequentially in numerical order, each pulse lasting through the duration of two message frames.

The 256 outputs of the decoding matrix, FIG. 6, are connected to the 256 address inputs of the local memory to provide selective access to the memory cells 59, FIG. 7, whenever the memory contents are to be changed according to changing traffic conditions. In addition, at each remote terminal, a set of 64 decoder outputs are connected to the control inputs of 64 transmission gates 96, FIGS. 3 and 6, each connected between a loop scan highway 97 and the 64 subscriber line units.

Within each line unit, a loop relay 33, 34 and contact 36 provide logic 1 whenever the subscriber telephone instrument is off-hook, logic 0 when on-hook. As time proceeds, the line counter 92 steps through its 256 binary states providing 256 sequential address pulses on the 256 output leads of the decoding matrix 93 and a set of 64 of these operate the line unit scanning gates 96 to provide a time division multiplex of 64 subscriber loop states, logic 0 or logic 1, on the loop scan highway. This loop scan passes through gate 98 to gate 99 and to gate 84. The gate 84 is controlled by the control output C of the time base. Thus, the outgoing C pulses are marked with the loop status information, logic 0 or 1, from the remote terminal. During this time, the second input to gate 99 is logic 0, as shall be presently described, so the loop scan information is unaltered.

Gate 98 is enabled only during the time that the set of 64 scanning pulses is operating the loop scanning gates. This enabling pulse is easily derived from the binary state of the line counter. Alternatively, it can be derived as the logical-or-function of the set of all 64 scanning pulses. When the enabling pulse is not present, the output of gate 98 is logic 0. The second input to gate 99 is connected to the output of the shift cell 83 which demultiplexes the incoming C bits. Thus, while gate 98 is disabled, gate 99 passes incoming C bit information to gate 84 and this information is immediately multiplexed onto outgoing C bits.

Because the line counter is advanced on every second S pulse, the loop status of a particular subscriber loop is marked on outgoing C bits of two successive message frames. This double coding of loop scan information is used to obtain error protection. If the two loop scan bits received at the control terminal do not agree, the information is ignored.

Reviewing the complete system, we have the following: a scanning frame comprises the C bits of 512 sequential message frames. The scanning time bases of all four remote terminals are operating in time synchronism. At the control terminal, all C-bits outgoing are marked logic 0.

At the first remote terminal, the loop scanning system marks outgoing C bits of the first 128 message frames with the doubly coded loop status information of the first 64 subscribers. Through the next 384 message frames, the first remote terminal merely repeats the incoming C bits outgoing, and these are all logic 0.

At the second remote terminal, the C bits of the first 128 message frames are repeated outgoing. The loop scanning system marks C-bits of the next 128 message frames with the doubly coded loop status information of the second 64 subscribers. Through the next 256 message frames, the second remote terminal repeats the incoming C-bits outgoing, and these are all logic 0.

At the third remote terminal, the C bits of the first 256 message frames are repeated outgoing. The loop scanning system marks C-bits of the next 128 message frames with the doubly coded loop status information of the third 64 subscribers. Through the next 128 message frames, the third remote terminal repeats the incoming C bits outgoing, and these are all logic 0.

At the fourth remote terminal, the C-bits of the first 384 message frames are repeated outgoing. The loop scanning system marks C-bits of the next 128 message frames with the doubly coded loop status information of the fourth 64 subscribers.

Finally, we have incoming to the control terminal, the set of 512 message frames in which the C bits of the first 128 are marked with loop scan information from the first remote terminal, the C-bits of the second 128 are marked with loop scan information from the second remote terminal, the C-bits of the third 128 are marked with loop scan information from the third remote terminal and the fourth 128 are marked with loop scan information from the fourth remote terminal.

This completes one cycle of loop scan information. A complete scan occupies 512 message frames. At a nominal frame rate of 50,000 frames/second, there are approximately 100 loop scans per second.

At the control terminal, the connection between each line unit, FIG. 4, and the central office switching machine comprises three wires: T, R and Slv. The T and R are the normal transmission pair corresponding to the T-R pair extending from the remote terminal to the subscriber instrument in conventional practice. The sleeve lead is a control lead within the central office switching machine. As previously described, the sleeve lead is normally off-ground when the subscriber line is idle.

The sleeve lead connects to ground whenever the switching machine completes a connection to the subscriber line appearance in order to complete a call toward the subscriber, a terminating call. After grounding the sleeve on a terminating call, the switch then applies ringing signal on the T-R pair to ring the subscriber telephone instrument at the remote terminal. Ringing ceases when the called subscriber answers or when the calling party abandons the call.

The sleeve lead also connects to ground when a subscriber, originating a call, goes off-hook and thereby presents a closed loop on his T-R pair. After grounding the sleeve on an originating call, the central office switch applies dial tone to the T-R pair, thereby inviting the calling party to proceed with dialing.

In either case, the sleeve lead remains grounded through the course of the call and goes off ground only when the subscriber instrument has gone on-hook and the central office switch has disconnected from the subscriber line appearance.

Within each line unit, a circuit converts the condition of the sleeve lead to logic 1 for sleeve on-ground and logic 0 for sleeve off-ground.

Figure 10:
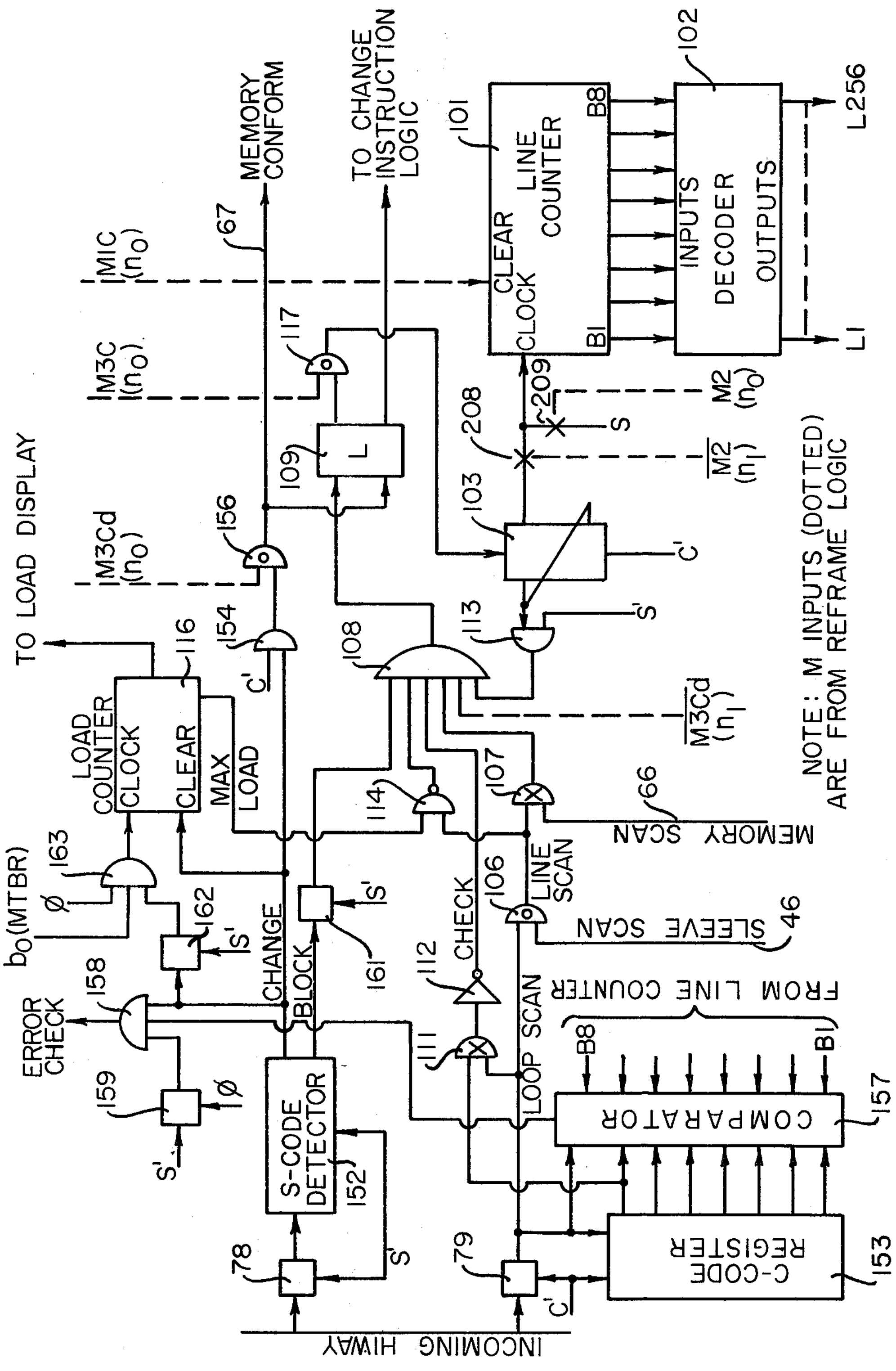
FIG. 10 shows the change detection logic at the control terminal.

The control terminal contains a scanning time base which consists of an eight-stage binary counter 101, FIG. 10, and associated decoding matrix 102, FIGS. 5 and 10. The line counter 101 is clocked by binary divider 103 and thereby advances one count for every second C' pulse. As the counter advances through its 256 binary states, it generates pulses sequentially on the 256 output leads L1–L256 of the decoding matrix. These pulses are used for three purposes: (1) scanning the line units for sleeve status; (2) scanning the local memory cells to determine memory status; and (3) addressing the local memory cells so that they can be selectively altered in accordance with changing traffic patterns. The latter two functions are applied only to the 256 memory cells 59 in the first rank associated with the MTBX. The 256 memory cells 68 in the second rank associated with the MTBR are not selectively addressed or scanned.

The 256 output leads of the decoding matrix are connected to the 256 inputs of the memory. Within the memory, the decoder pulses sequentially operate 256 transmission gates 64 which are connected between the 256 memory cells and a memory scan highway 66, FIG. 8.

The 256 output leads of the decoding matrix are also connected to the 256 control inputs of the 256 transmission gates 104, FIGS. 4 and 5, which are connected between the 256 line units and a sleeve scan highway 46.

As time proceeds, the scanning time base generates a sequence of 256 scanning pulses which operate associated transmission gates to provide a time division multiplex of subscriber sleeve states on the sleeve scan highway and a time division multiplex of memory cell states on the memory scan highway.

At the control terminal, the loop scan information transmitted from the four remote terminals is incoming on C bits of the received bit stream and is reporduced at the output terminal of shift cell 79.

The scanning time base at the control terminal operates in synchronism with the scanning time bases of the remote terminals so that, for example, the loop status of subscriber 83, the sleeve status of subscriber 83, and the logic state of the corresponding memory cell are present simultaneously on the loop scan highway, the sleeve scan highway, and the memory scan highway.

Traffic Logic

As described in connection with FIGS. 3 and 4, a subscriber line is active if its loop state is logic 1 (instrument off-hook), or if its sleeve state is logic 1 (sleeve on ground), or both. A subscriber line is idle if its loop state is logic 0 (instrument on-hook) and its sleeve state is logic 0 (sleeve off-ground). Therefore, the logical OR function of the loop state and sleeve state is 1 for an active line, 0 for an idle line.

An active subscriber line requires a transmission channel and an idle line does not. A subscriber line has a transmission channel if its memory cell 59 in local memory is logic 1; it does not have a transmission channel if its memory cell 59 is logic 0. If the transmission channel assignment is consistent with the subscriber line status, no action is required. If the transmission channel assignment is not consistent with the subscriber line status, the system should change the transmission channel assignment accordingly.

In terms of logic states, if the subscriber line state and local memory cell state are alike (both 0 or both 1), no action is required; if the subscriber line state and memory cell state are unlike, the system should change the memory cell state accordingly.

At the control terminal, FIG. 10, the incoming loop scan and the local sleeve scan are combined in OR gate 106, FIG. 10, to derive the line scan. The line scan and the memory scan are combined in exclusive OR gate 107 to derive a change command which is logic 0 if no change is required, logic 1 if a change is required. If the change command is logic 1, it enables AND gate 108 through which a read pulse can set a latch 109 which initiates a traffic change procedure.

All of the scanning time bases 91, FIG. 9, are clocked once on every second message frame by binary divider 94. Thus, for any line, the scan interval is two message frames. At the remote terminals, the loop state of a particular line is marked on C bits of two successive message frames. At the control terminal, two demultiplexed C bits, output of shift cell 79, represent the loop status of a particular line. These two bits are compared for likeness or unlikeness. If they ar unlike, the loop state is ambiguous and should be ignored. This strategy is used to protect the system from executing traffic changes which would otherwise be caused by occasional random transmission errors of C bits from remote terminals to control terminal.

Figure 14:
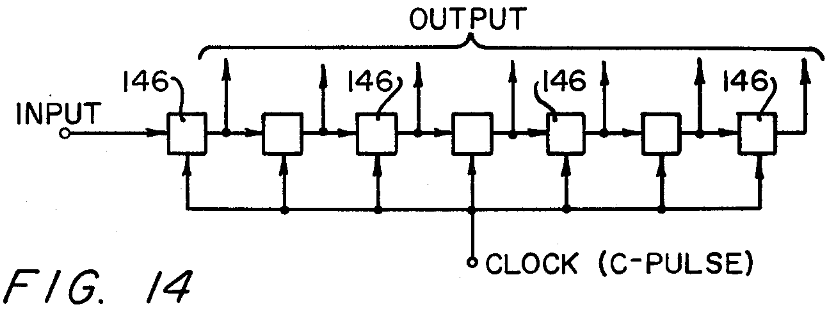
FIG. 14 shows a C-code register.

At the control terminal, demultiplexed C bits from shift cell 79 are delayed one message frame by the first cell of the C-code register, FIGS. 10 and 14 clocked by the C′ pulse of the MTBR. The input and output of this shift cell are combined in exclusive OR gate 111, then inverted by inverter 112 to derive a check signal. The check signal is logic 1 if the two bits of the pair are alike, logic 0 if unlike. When the check signal is logic 0, it disables gate 108 and prevents the read pulse from setting latch 109, regardless of the change command.

The check signal is valid when the two inputs to gate 111 represent the two C-bits of a loop scan pair. In the next message frame, the check signal is invalid because it compares the last bit of one pair with the first bit of the next pair. For this reason, the read pulse to gate 108 is applied only every second frame, coincident with the valid check signal. The read pulse is derived by gating S′ pulse through gate 113, enabled by binary divider 103.

To maintain desired transmission quality, the number of transmission channels assigned to active subscriber lines should be limited. By way of example, when the system has assigned 62 transmission channels to active lines, it will reject commands for transmission channel additions, but will accept commands for transmission channel deletions. That is, it accepts change commands for which the line scan is logic 0, but rejects change commands for which the line scan is logic 1. This is accomplished by disabling gate 108 whenever the line scan is 1 and the current traffic load is 62 message channels. The disabling signal is derived from NAND gate 114 which has one input connected to the line scan and the other input connected to a traffic load counter 116. The second input is normally logic 0, but logic 1 whenever the current number of message channels is 62 or more.

FIGS. 11A–G are a timing chart illustrating the traffic logic. FIG. 11A shows the incoming bit stream with C and S bits. The notation L82, L83, etc., on incoming C bits signifies that the bit carries the loop status logic 0 or logic 1 of lines 82 and 83 encoded by the remote terminal. The dotted space between each S bit and the following C bit contains many bits constituting transmission channels.

FIGS. 11B and 11C show the occurrence of S′ pulses and C′ pulses in the control terminal MTBR. The S′ and C′ pulses are delayed half a bit time from the incoming S and C bits. This is done so that the leading edges of the S′ and C′ pulses coincide with the middle of the incoming bits. This is optimum for unambiguous demultiplexing and allows for some timing jitter on the incoming bit stream. FIG. 11D shows the output of shift cell 79 which is the incoming loop scan and is maintained for a message frame. FIG. 11E shows the counter clock pulses generated by binary divider 103. FIG. 11F shows the current line count of the line counter 101, or correspondingly, the active output terminal L1–L256 of the decoder 102 of the scanning time base. The line count is synchronized to the incoming loop scan. FIG. 11G shows read pulses passed by gate 113 to gate 108. These occur only every second frame when the counter clock is logic 0. At this time, the check signal derived from the pair of loop scan bits is logic 1 and gate 108 is enabled.

Figure 11:
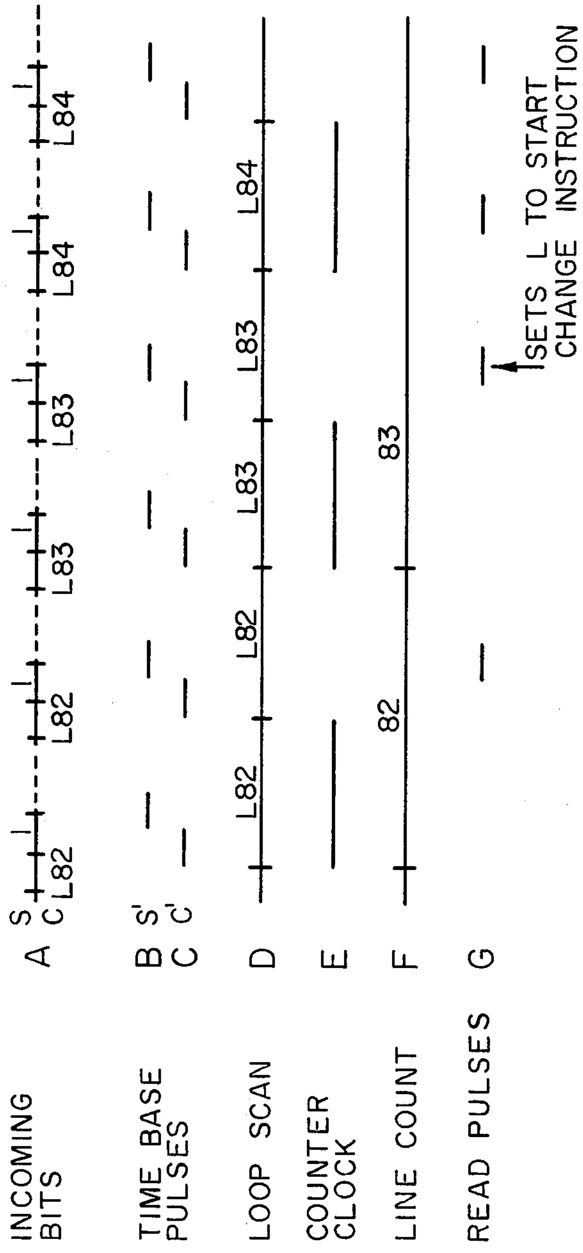
FIG. 11 shows the timing details of the scanning time base at the control terminal.

In FIG. 11 it is assumed that there has been a traffic change involving subscriber line 83. Therefore, the change command signal is logic 1 and the read pulse is passed through gate 108 to set latch 109. When latch 109 sets, it applies logic 1 through OR gate 117 to the clear terminal of binary divider 103 holding its output at logic 0. This stops the line counter 101 on count 83. With the counter clock held on logic 0, read pulses occur on every S′ pulse, but this is of no consequence because latch 109 is already set. Latch 109 will remain set until the traffic change procedure is completed.

Traffic Change Procedure

When the system traffic pattern changes, the change is detected in the traffic logic including gates 106 and 107 of the control terminal and latch 109 is set as just described. This initiates a traffic change procedure.

For specificity it will be assumed that the traffic change is precipitated by subscriber 83 going off-hook. Before the change, memory cell 83 is marked logic 0 in all line memories. When the change command sets latch 109, the line counter 101 in the scanning time base at the control terminal is at the count of 83, FIG. 11F.

When latch 109 sets, it applies logic 1 through gate 117 to the clear terminal of binary divider 103. This stops clock pulses to the line counter 101 which will rest on count 83 until latch 109 clears. With the counter stopped, the scanning time base is addressing cell 59 corresponding to subscriber 83 of the memory, and the signal on the memory scan highway 66 is the state of memory cell 59 corresponding to subscriber 83, in this example logic 0.

Figure 12:
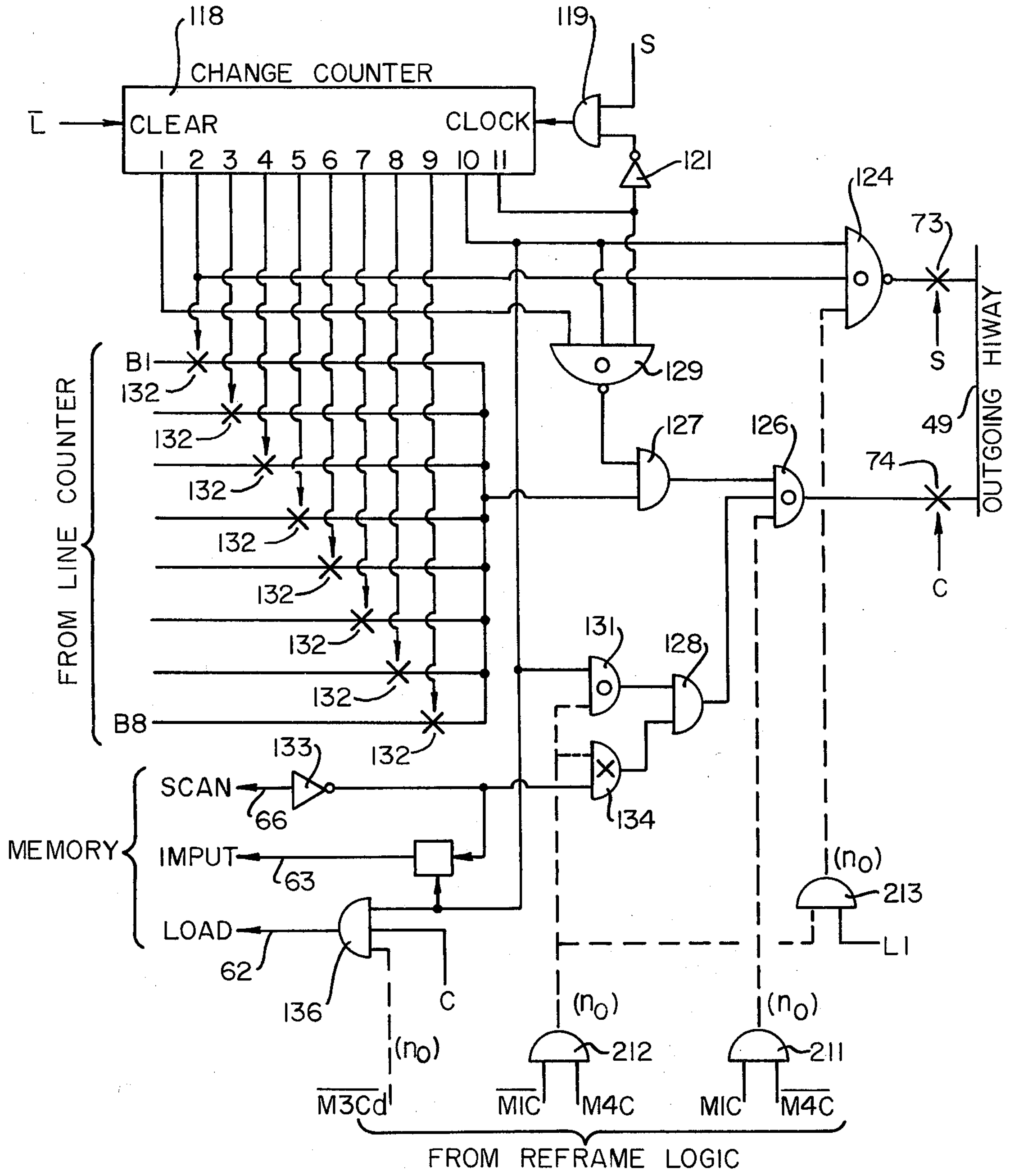
FIG. 12 shows the change instruction logic at the control terminal.

In the control terminal there is change instruction logic shown in detail at FIG. 12. The change instruction logic includes a change counter 118 consisting of a binary counter with decode matrix to provide eleven separate output leads numbered 1 through 11. The counter is clocked through gate 119 by the S-pulse of MTBX.

When latch 109 is clear, it applies logic 1 to the clear terminal of the change counter, thereby maintaining logic 1 at decoder output lead 1. All other decoder output leads are logic 0. When latch 109 sets, it removes logic 1 from the counter clear terminal and the counter advances through its counting sequence, clocked by S pulse applied through gate 119. The logic 1 output steps sequentially, once per frame, from one terminal to the next terminal up to terminal 11. When logic 1 appears on output terminal 11, it disables gate 119 through inverter 121 thereby blocking the clock pulses. The change counter waits in this condition until latch 109 clears at the completion of the traffic change procedure.

Because the change counter is clocked by S pulse of MTBX and advances on rising edge of the clock pulse, each state of the change counter begins at the start of a message frame and ends at the end of a message frame. The change counter controls the logic marking of S bits and C bits onto the outgoing highway of the control terminal. These bits are marked via gates 73 and 74, operated by S pulse and C pulse of the MTBX.

As described, the change counter normally rests in state 1 and the inputs to NOR gate 124 are all logic 0, and the outgoing S bit clocked by the S pulses is logic 1. When the change counter is in state 2 or 10, it provides a 1 input to gate 124 and the outgoing S bit is marked logic 0.

The outgoing C bit is controlled by gate 126, controlled in turn by AND gates 127 and 128. Gate 127 is disabled by NOR gate 129 whenever the change counter is in states 1, 10 or 11. Gate 128 is disabled by OR gate 131 except when the change counter is in state 10. Whenever the change counter is in state 1, normal rest state, or state 11, waiting state, the outgoing C bit is logic 0.

In change counter states 2 through 9, gate 127 is enabled via gate 129. These states of the change counter operate eight transmission gates 132 in sequential order, passing logic states B1 through B8 through gates 127, 126 and 74 onto C bits on the outgoing highway. The logic states B1–B8 are the eight binary states of the counting cells in the line counter which is stopped on count 83, and the eight-bit word is the binary representation of the current state of the line counter 101.

In the change counter state 10, gate 131 enables gate 128 which passes the memory scan signal inverted by inverter 133 through exclusive OR gate 134, AND gate 128, OR gate 126 and gate 74 onto the C bit slot on the outgoing highway.

To summarize the foregoing:

| Change counter state | Output S bit | | Output C bit | |
|---|---|---|---|---|
| 1 (normal rest state) | 1 | | 0 | |
| 2 | 0 | | B1 | |
| 3 | 1 | | B2 | |
| 4 | 1 | | B3 | |
| 5 | 1 | S-Code | B4 | C-Code |
| 6 | 1 | | B5 | |
| 7 | 1 | | B6 | |
| 8 | 1 | | B7 | |
| 9 | 1 | | B8 | |
| 10 | 0 | | $\overline{M}$ | |
| 11 (waiting state) | 1 | | 0 | |

$\overline{M}$ indicates inverse of current state of line memory cell designated by binary code B1–B8. In the example, B1–B8 indicates cell 83 for which M is 0 and $\overline{M}$ is 1.

When the change counter steps to state 10, the rising edge of the pulse on output 10 clocks shift cell 135 to register the inverted memory state $\overline{M}$ at it output, presenting same to the memory input terminal 63, FIG. 8. The same pusle enables gate 136, and the following C pulse from MTBX passes through gate 136 to the memory load terminal 62. This changes the state of memory cell 83 from 0 to 1. All subsequent message frames of the MTBX now include a message channel for line 83.

The change instruction emitted from the control terminal on the outgoing highway is contained within nine message frames. In the first and last of these, the S bit is marked 0. The first eight C bits carry the eight-bit binary designation of the memory cell and the ninth C bit carries the logic state to be entered into the designated memory cell.

At each remote terminal, S bits are simply repeated through the terminal. Therefore, the S code passes through each remote terminal in turn and arrives back at the control terminal.

Figure 13:
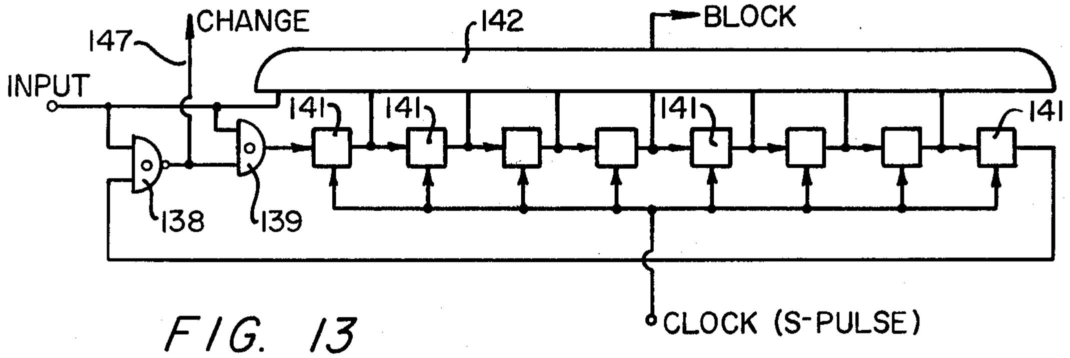
FIG. 13 shows an S-code detector.

At each remote terminal S bits are also demultiplexed and presented to an S-code detector 137, FIGS. 9 and 13, containing logic gates 138, 139 and 142 and eight cells 141 forming a shift register clocked by S pulse of the MTB. The input and the eight outputs of the shift register are combined in gate 142 to derive a block signal. Normally, all S bits are logic 1, so all inputs to gate 142 are logic 1 and the block signal is logic 1. When the S code arrives at the remote terminal the first 0 of the S code is clocked through the shift register, providing an 0 input to gate 142 for nine frames. This forces the block signal to 0. The first 0 bit of the S code arrives at the last output of the shift register coincident with the arrival of the last 0 bit of the S code at the input. Both are applied to gate 138 providing a 1 output on the change lead 147 and a 1 input to the shift register via gate 139, so that the second 0 of the S code does not enter the shift register. Thus, the block signal is logic 0 for nine frames and no longer.

In FIG. 9 the block signal from the S code detector disables gate 98 for nine frames in order to block loop scan information from entering gate 99. With gate 98 blocked, the incoming nine-bit C code is passed through gate 99 unaltered, and repeated on C bits outgoing to the next remote terminal. Thus, the C code passes through each remote terminal in turn and arrives back at the control terminal.

At each remote terminal, the C bits are demultiplexed and presented to a C code register, FIGS. 9 and 14, consisting of seven cells 146 clocked by C pulse of the MTB. When logic 1 output appears on the change lead 147 of the S code detector, FIG. 13, the C code register input is B8 and its seven outputs are B7 through B1. The change signal enables gate 150, FIG. 9, which passes a pulse to the jam terminal of the line counter 92. This pulse forces each of the eight states of the binary counter to adopt the logic state of its corresponding jam input leads. To avoid the possible problem of a second transient jam pulse at the end of the change pulse, the jam pulse is delayed one time slot behind S pulse by passing S pulse through a shift cell 148 clocked by bit clock 149. The jam pulse sets the line counter to count 83, thereby providing address pulse L83 to memory cell 83.

On the next C pulse the demultiplexed C bit is $\overline{M}$ and the change signal has enabled gate 151 to pass C pulse to the load terminal 62 of the memory, FIG. 7. Therefore, the load pulse sets cell 83 to $\overline{M}$, which is logic 1. The next message frmae contains a message channel for line 83 and the line counter resumes counting and scanning from line 83. The jam pulse also clears binary divider 94 via gate 152 so that the counter clock is in a known phase as the count resumes.

Figure 15:
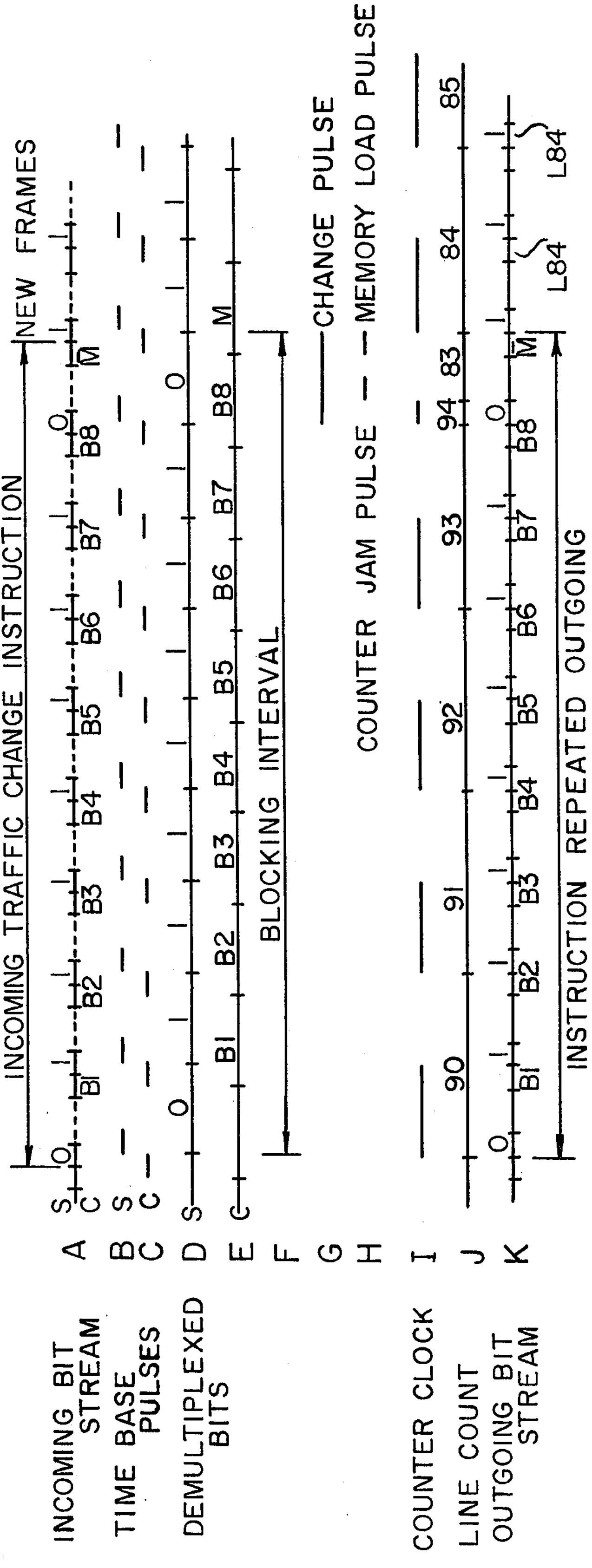
FIG. 15 shows the timing details of traffic change at a remote terminal.

FIGS. 15A–K show timing details of the traffic change procedure at the remote terminal. FIG. 15A shows the incoming bit stream with C and S bits marked with the S code and C code generated by the change counter operations at the control terminal. The dotted lines between each S bit and the following C bit contain many bits constituting message channels.

FIGS. 15B and 15C show the occurrence of S pulses and C pulses in the remote terminal MTB. FIGS. 15D and 15E show the demultiplexed S and C bits at the input to the S code detector 137 and the C code register.

FIG. 15F shows the duration of the blocking output from the S code detector. FIG. 15G shows the occurrence of the change pulse from the S code detector. FIG. 15H shows the occurrence of the counter jam pulse and the memory load pulse.

FIG. 15I shows the counter clock pulse generated by binary divider 94 and FIG. 15J shows the current state of the line counter, or correspondingly, the active output terminal of the counter decoding matrix, FIG. 15K shows the bit stream outgoing from the remote terminal.

In FIG. 15J it is assumed that the line counter has advanced from count 83 to count 90 when the change instruction arrives, and to count 94 when the jam pulse occurs. The jam pulse forces the line count to 83 and the counter clock to 0. The memory is loaded while the count is 83 and the demultiplexed C bit is $\overline{M}$ of the change instruction. During the blocking interval the terminal repeats the incoming C code outgoing. When the blocking interval ends the terminal marks outgoing C bits with loop scan information. Thus, L84 on C bits of FIG. 15K indicates the loop status (0 or 1) of line 84.

From the foregoing, it is seen that the control terminal adopted the new message frame immediately after transmitting the ninth frame of the change instruction. The remote terminal adopts the new message frame immediately after receiving the ninth frame of the change instruction. Thus, the two terminals change from in synchronism as required. The change instruction is repeated unaltered through each remote terminal. Thus, each remote terminal executes the frame change, all in sequential synchronous order.

Finally, the change instruction arrives back at the receiving side of the control terminal, where latch 109, FIG. 10, is still set and the line counter 101 remains stopped on the count of 83. The change counter 118, FIG. 12, is still waiting in state 11.

Figure 16:
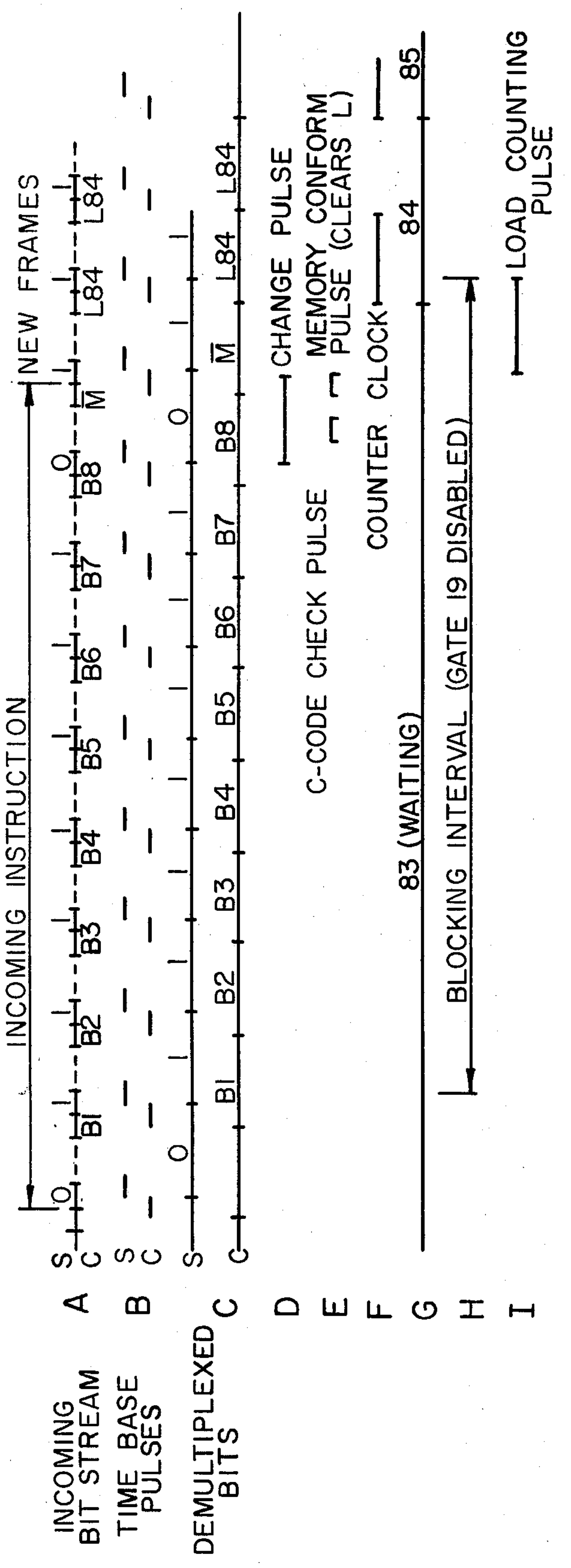
FIG. 16 shows the timing details of traffic change at the control terminal.

The control terminal also contains an S code detector 152 and a C code register 153, as in FIGS. 13 and 14; see FIG. 10 for circuit details and FIG. 16 for timing details.

When the S code detector 152 generates its change pulse, it enables gate 154 which passes C′ pulse via gate 156 to the conform terminal 67 of the memory. The conform pulse causes every cell of the receiving half of the memory, FIGS. 5 and 8, to adopt the same logic state as the corresponding cell of the transmitting half of the memory. Thus, receiving memory cell 83 changes to logic 1. In subsequent frames, the MTBR contains a message channel for line 83. Thus, the MTBR executes the traffic change in sequential synchronism and the whole system is now configured to the new traffic pattern.

The conform pulse also clears latch 109, FIG. 10. This removes the clear signal via gate 117 to the binary divider 103, which now resumes operation and supplies clock pulses (every second frame) to line counter 101. Thus, the line counter resumes counting from the count of 83.

When latch 109 clears, it also applies logic 1 to the clear terminal of the change counter 118, FIG. 12, thereby returning the change counter to state 1.

Throughout this change procedure the system has continued to circulate complete message frames around the transmission loop, providing uninterrupted transmission to all existing traffic. Only S bits and C bits have been utilized to execute the traffic change. The traffic change requests the addition of one more message channel to the message frame. This addition increases the frame length by one time slot. It is executed at each terminal in sequential synchronism so that at each terminal the change in the MTB frame coincides precisely with the arrival of the augmented incoming frame. Thus, all MTB's remain frame synchronous before and after the change and the system does not misframe. It is now evident that the scanning time bases at all terminals will normally operate in synchronism. This follows because any traffic change procedure first stops the line counter at the control terminal on a specific count, then sets all remote line counters to the same count, then starts all line counters from that count in sequential synchronous order. If any line counter fell out of synchronism, it would generate spurious loop scan information which would precipitate a traffic change. The traffic change would resynchronize the line counters.

At the control terminal the C bits are read into a C code register 153, FIG. 10. When the change pulse occurs in the S code detector, the C code register contains the eight bits B1 – B8 of the change instruction repeated from the last remote terminal. These bits should agree with the eight states of the line counter. The two sets of eight bits are applied to a comparator 157 which provides output signal logic 0 if the two sets are identical, bit-by-bit, logic 1 if the two sets are not identical. The comparator may consist of eight exclusive OR gates for which one set of eight inputs are connected to the C code register and the other set of eight inputs are connected to the line counter. Each exclusive OR gate compares one counter bit against one register bit. The eight outputs of the exclusive OR gates are combined in an OR gate so that if any bit comparison (unlike) yields a logic 1 the OR gate output is logic 1

When the change pulse occurs, it enables AND gate 158 through which a check pulse can set a misframe latch if, and only if, the received C code does not agree with the current state of the line counter. Setting of the misframe latch forces the whole system into a reframing mode to be described later. This provision provides protection against transmission errors in the change instruction. A C bit transmission error could cause a remote terminal to mark the wrong cell in its local memory, thereby misframing its message time base, even though the frame length remained consistent with the rest of the system.

To avoid the possible problem of a second transient check pulse at the end of the change pulse, the check pulse is delayed one time slot behind the S′ pulse by passing S′ pulse through shift cell 159 clocked by bit clock.

It is not necessary to check the final bit $\overline{M}$ of the incoming change instruction because a transmission error on $\overline{M}$ would mark the remote terminal memory cell wrongly, thereby producing at the remote terminal an MTB frame of wrong frame length. This would automatically misframe the system.

Timing details are shown in FIGS. 16A–I. FIG. 16A shows the incoming bit stream with S and C bits explicitly marked. FIG. 16B shows the occurrences of S′ and C′ pulses at the MTBR. FIG. 16C shows demultiplexed S and C bits. FIG. 16D shows the occurrence of the change pulse from the S code detector. FIG. 16E shows the occurrence of the C code check pulse and the memory conform pulse. FIG. 16F shows the counter clock and FIG. 16G shows the current state of the line counter. Note that the line counter resumes counting in synchronism with the loop scan information, FIG. 16C.

In FIG. 10 the block output from the S code detector 152 is delayed one frame by shift cell 161 to provide a blocking interval, FIG. 16H, during which gate 108 is disabled. This removes the possibility that a read pulse could set latch 109 immediately after it clears. The first read pulse which can set 109 is the one occurring within count 84.

FIG. 16I shows a load counting pulse following the change pulse, FIG. 16D. After the memory conforms, the duration of pulse b0 from the steering tree of the MTBR, to be presently described, is a measure of the number of message channels provided by the system. The load counting pulse is derived by delaying the change pulse for one frame by means of shift cell 162, FIG. 10. The change pulse clears the counter 116 to count 0. The delayed change pulse enables gate 163 which provides bit clock to the load counter through the interval when *b*0 of the MTBR is logic 1. The counter advances to the count equal to the number of message channels. It holds this count until the next traffic change occurs.

The load counter provides the count of current traffic load (i.e. transmission channels) on the system. It can be connected to appropriate display means to provide a continuous record of traffic activity on the system. When the load counter reaches the maximum permitted load count, it enables gate 114, thereby preventing further additions to the traffic load but permitting deletions from the maximum traffic load, as previously described.

The traffic change procedure just described contains protection against transmission errors on S bits which are normally logic 1. A transmission error would mark an S bit as logic 0. This would be interpreted as the start of an S code for a traffic change. However, the change is executed only if the second logic 0 occurs eight frames after the first. Therefore, random line errors on S bits do not precipitate spurious frame changes.

When a random error does mark S logic 0, the S code detector 137 in the remote terminal, FIG. 9, blocks the local loop scan to ensure through transmission of the following nine C bits. These nine C bits are spurious and could cause spurious operation of the traffic logic at the control terminal. However, the control terminal also generates a blocking signal, FIG. 16, which disables gate 108 through the nine frame interval when the spurious C bits replace valid loop scan information. Therefore, latch 109 cannot set, and spurious change instructions are not generated.

Systems Reframing Procedure

With the system in normal operation, the cells of the local memory at the control terminal, FIG. 8, and at the remote terminal, FIG. 7, are identically marked with the current traffic pattern. The frame structure defined by the MTB timing pulses is identical at each terminal. In addition, the MTB frame at each terminal is synchronous with the incoming bit stream so that the occurrence of S pulse in the MTB coincides with the arrival of incoming S bits.

A misframe condition is indicated whenever the S pulse of the MTB no longer coincides with the arrival of incoming S bits. This would occur if any MTB frame slipped out of synchronism or if any MTB frame was of different bit length than the system frame.

It is possible to postulate highly improbable fault conditions wherein one of the terminals has its local memory marked with the same total number of logic 1's as the other memories, but not identically cell-by-cell. Then the MTB frame generated at this terminal is of proper length but improper structure. This implies at least two compensating errors in the faulty memory. The MTB would effectively assign message channels to lines in improper order. This would create improper connections among current users and shortly after there would be traffic changes precipitated by current users terminating their calls. The traffic changes would alter the faulty memory to a new configuration in which its total number of logic 1's would no longer be the same as that of the other memories. Then its frame length changes and this would misframe the system.

As an example, assume that the correct memory marking has logic 1 in cells 4, 7, 21, 26, etc. and that the faulty memory has logic 1 in cells 4, 11, 21, 26, etc. Then, effectively, line 7 is connected to line appearance 11, and line 11 is connected to line appearance 7. Both of subscribers 7 and 11 are misconnected. If line 7 terminates its call, the ensuing traffic change will change cell 7, and the correct memories are altered to logic 1 in cells 4, 21, 26, etc. But this does not change the faulty memory because its cell 7 is already marked logic 0. Now the faulty memory contains one excess logic 1 cell 11 and its frame length no longer conforms to the rest of the system and the system is misframed.

S bits are normally marked logic 1 to provide a means for verifying the in-frame condition. If the bit which is detected is not always logic 1, it is an indication of an out-of-frame condition. None of the interior bits in the message frame can be logic 1 continuously because these bits represent delta modulation encoding of speech waveforms. As is well known, delta modulation encoding procedures a balanced bit stream wherein the average density of 1's or 0's is 50%. Indeed, with zero input signal a delta modulation encoder produces an alternating bit stream at its output. Similarly, the C bits cannot be logic 1 continuously because these bits are all 0 outgoing from the control terminal, and accumulate selected portions of loop scan information as they pass through each remote terminal. At each remote terminal some segment of the incoming loop scan is 0. At the control terminal the incoming C bits could be all 1 only in the most improbable event that all subscriber loops are in the off-hook condition. Even so, this event would not misframe an in-frame system which monitors S bits, not C bits, and the event would rapidly terminate as subscribers denied service return to on-hook condition.

At each terminal a frame monitor circuit, to be presently described, monitors the incoming bit demultiplexed by S pulse of the MTB. If the terminal is in-frame these are S bits, all logic 1 except for occasional logic 0's due to incidental transmission errors on the digital line, or occasional logic 0's involved in normal traffic changes. If the terminal is out-of-frame, the monitored bit is not the incoming S bit and this will be evident by a much higher density of logic 0's at the input to the frame monitor circuit. The frame monitor circuit responds to this higher density of logic 0's, but does not respond to the very low density of logic 0's expected on S bits. Typically, the response threshold of the frame monitor circuit will be set well below 50% to ensure positive response to the out-of-frame condition.

Figure 17:
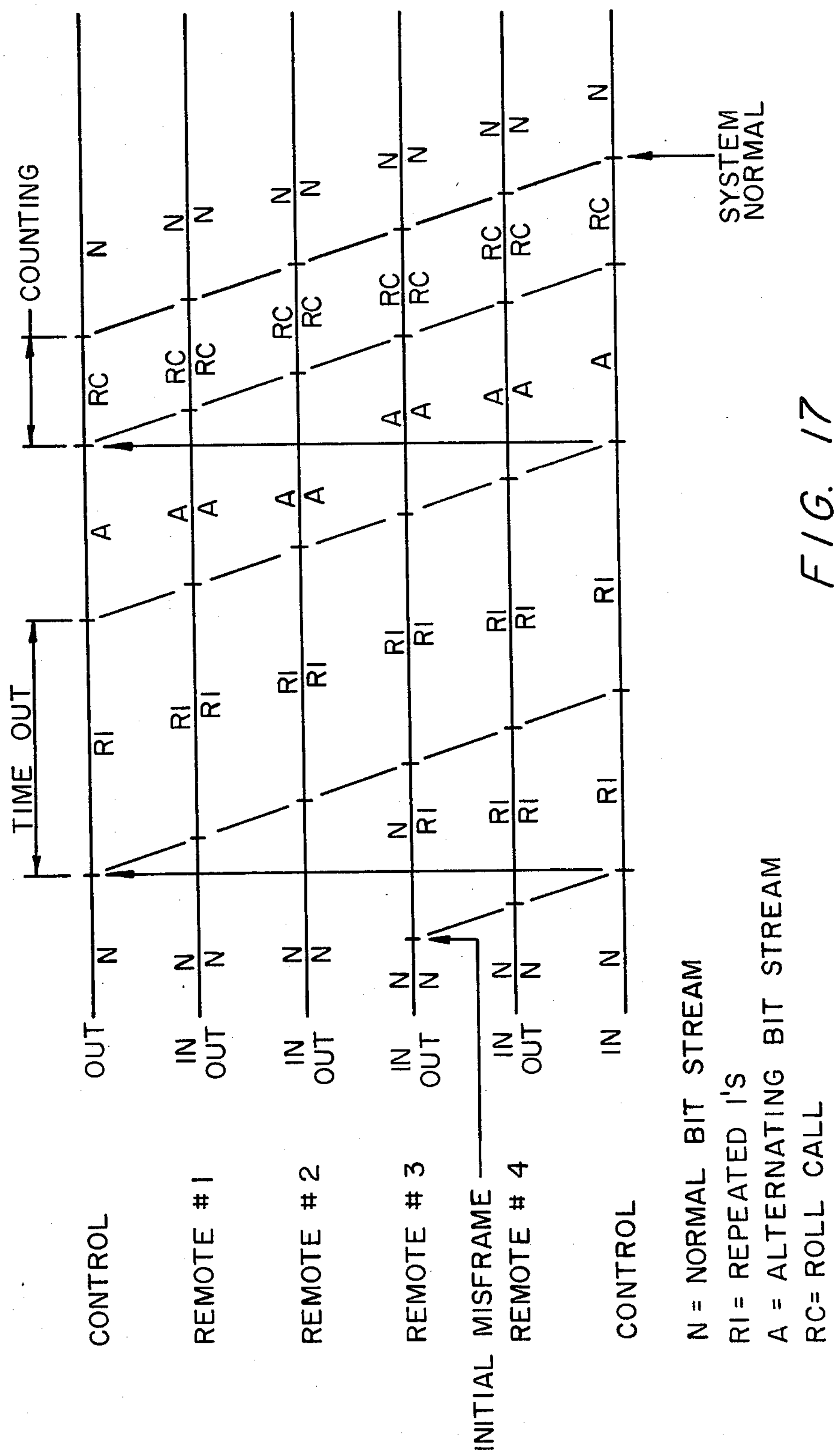
FIG. 17 illustrates the terminal bit stream during a reframe procedure.

In the overall system a misframe condition might originate at any one of the terminals. When a misframe does occur, the system must automatically restore itself to normal in-frame operation by means of a reframe procedure. This procedure is illustrated in FIG. 17 which shows the bit streams in and out of each terminal as a function of time. These are staggered in time to explicitly indicate transmission propagation delay from one terminal to the next.

We start with the system operating normally in the inframe condition. Bit streams are marked N for normal. Then a misframe condition is detected at remote terminal 3. The misframe causes this terminal to adopt a two-bit frame mode, wherein the MTB generates only S pulses and C pulses interleaved in time, with no interior pulses in the MTB frame. It also causes this terminal to emit logic 1 on all bits outgoing. Thus, the output bit stream is simply repeated 1's, designated R1 in FIG. 17. The input bit stream to remote terminal 3 remains normal, but the input bit stream to remote terminal 4 becomes R1.

Each terminal is equipped with a pattern detector with two separate outputs P1 and P2. The pattern detector monitors the incoming bit stream. In normal operation, both outputs P1 and P2 are logic 0. If the incoming bit stream is R1 for a sustained interval, typically about 100 bits, the pattern detector produces logic 1 output at P1. Conversely, if the incoming bit stream is an alternating pattern (0101---), designated A in FIG. 17 for a sustained interval, typically about 10 bits, the pattern detector produces logic 1 output at P2. The pattern detector circuit will be presently described.

When remote terminal 4 receives R1 from terminal 3, its pattern detector produces logic 1 output at P1 which throws this terminal MTB into a two-bit frame mode, and also causes this terminal to emit repeated logic 1's, R1, FIG. 7.

At the control terminal, incoming R1 pattern causes the pattern detector to produce logic 1 output at p1 which throws both MTBR and MTBX into a two-bit frame mode and also causes the control terminal to emit logic 1 on S bits and C bits, R1 outgoing.

When remote terminal 1 receives R1 from the control terminal, it reacts as did terminal 4. When terminal 2 receives R1 from terminal 1, it reacts similarly. Thus, all terminals are in a two-bit frame mode emitting R1 to the next terminal. All time bases will remain in the two-bit frame mode until the end of the reframe procedure.

The R1 condition persists for a time sufficient to ensure that all terminals are in the R1 mode. Then, by means of a time out circuit, the control terminal changes its output bit stream to logic 1 on S and logic 0 and C. This produces an alternating pattern, designated A in FIG. 17, outgoing from the control terminal.

At remote terminal 1, when the incoming bit stream changes from R1 to A the terminal time base may be in-frame or out-of-frame with the incoming bit stream. If in-frame the bit demultiplexed by S pulse is logic 1 (S bit), if out-of-frame the bit demultiplexed by S pulse is logic 0 (C bit). The frame condition is immediately evident and the terminal can acquire frame very rapidly on the first logic 0 of A by shifting its MTB by one time slot since the system is still in a two-bit frame mode.

On receipt of pattern A incoming, remote terminal 1 acquires frame. Also, its pattern detector produces logic 1 output at P2 which cancels R1 outgoing. The terminal now repeats its input bit stream outgoing, namely A, toward remote terminal 2. In a similar manner. terminals 2, 3 and 4 reframe in sequence. When the control terminal receives pattern A incoming from terminal 4, the MTBR acquires frame on the incoming bit stream and its pattern detector produces logic 1 output at P2. This causes the transmitting half of the control terminal to start a roll-call, designated RC in FIG. 17, on its outgoing bit stream.

The roll-call consists of 256 two-bit frames. In the first frame, the S bit is logic 0 and in the remaining frames, logic 1. This logic 0 S bit serves as a start code for the roll-call. The 256 C bits are marked in sequential order with the logic states of the 256 cells in the transmitting half of the control terminal memory. To generate the roll-call, the control terminal, FIG. 10, simply runs its line counter 101 from count 1 to count 256, clocked once per frame by S pulse of the MTBX, and writes its memory scan signal onto outgoing C bits. When the line counter reaches count 256, the clock is removed and the counter stops and waits on count 256. Also, at the end of roll-call, the MTBX switches out of its two-bit frame mode and into normal frame mode, designated N in FIG. 17. Thus, all subsequent frames outgoing from the control terminal are of normal structure, providing tranmission channels for each line whose associated memory cell is logic 1.

When the roll-call arrives incoming to remote terminal 1, the roll-call start code causes the line counter to start counting from count 1 to count 256, clocked once per frame, thereby providing address pulses in sequential order to the local memory cells, FIG. 7. Simultaneously, incoming C bits are applied to the memory input, and load pulses are applied to the memory load terminal. Thus, the local memory is loaded with the incoming roll-call information and is thereby forced into conformity with the transmitting half of the memory at the control terminal. When the line counter reaches count 256, the MTB switches out of its two-bit frame mode and into normal frame mode. Thus, all subsequent frames generated by the MTB of the remote terminal are of normal structure and the terminal continues to be in-frame with its incoming bit stream.

When the remote terminal switches to normal frame mode, it also switches the line counter clock to its normal clock source. Thus, the line counter advances to count 1 and continues counting to provide loop scanning information as in normal operation. While remote terminal 1 is receiving the roll-call, it is also repeating incoming S bits and C bits outgoing toward remote terminal 2. Thus, terminal 2 receives the same roll-call and responds as described above. Similarly, for remote terminals 3 and 4.

Finally, the roll-call arrives back at the receiving side of the control terminal. The receiving half of the local memory (which normally controls MTBR) is conformed to the transmitting half, but the MTBR remains in the two-bit frame mode. The start code (first S bit) of the roll-call causes a reframe counter to start counting from count 1 to count 256, clocked once per frame of the MTBR. When the reframe counter reaches count 256, the MTBR switches out of its two-bit frame mode and into normal frame mode. Thus, all subsequent frames generated by the MTBR are of normal structure and the terminal continues to be in frame with its incoming bit stream. When the receiving half of the control terminal switches to normal frame mode, it also applies normal clock signal to the line counter, which has been waiting on count 256 since the end of the outgoing roll-call. Thus, the line counter advances to count 1 and starts normal scanning operations in synchronism with the incoming loop scan from remote terminals.

The complete system is now in normal operation. The whole reframe procedure has consumed, at most, a few thousand bits or, correspondingly, a few milliseconds of time from initial misframe to in-frame operation.

Reframing Circuits

Circuit details and associated timing diagrams of the reframing logic are shown in FIGS. 18, 19, 20 and 21.

Figure 18:
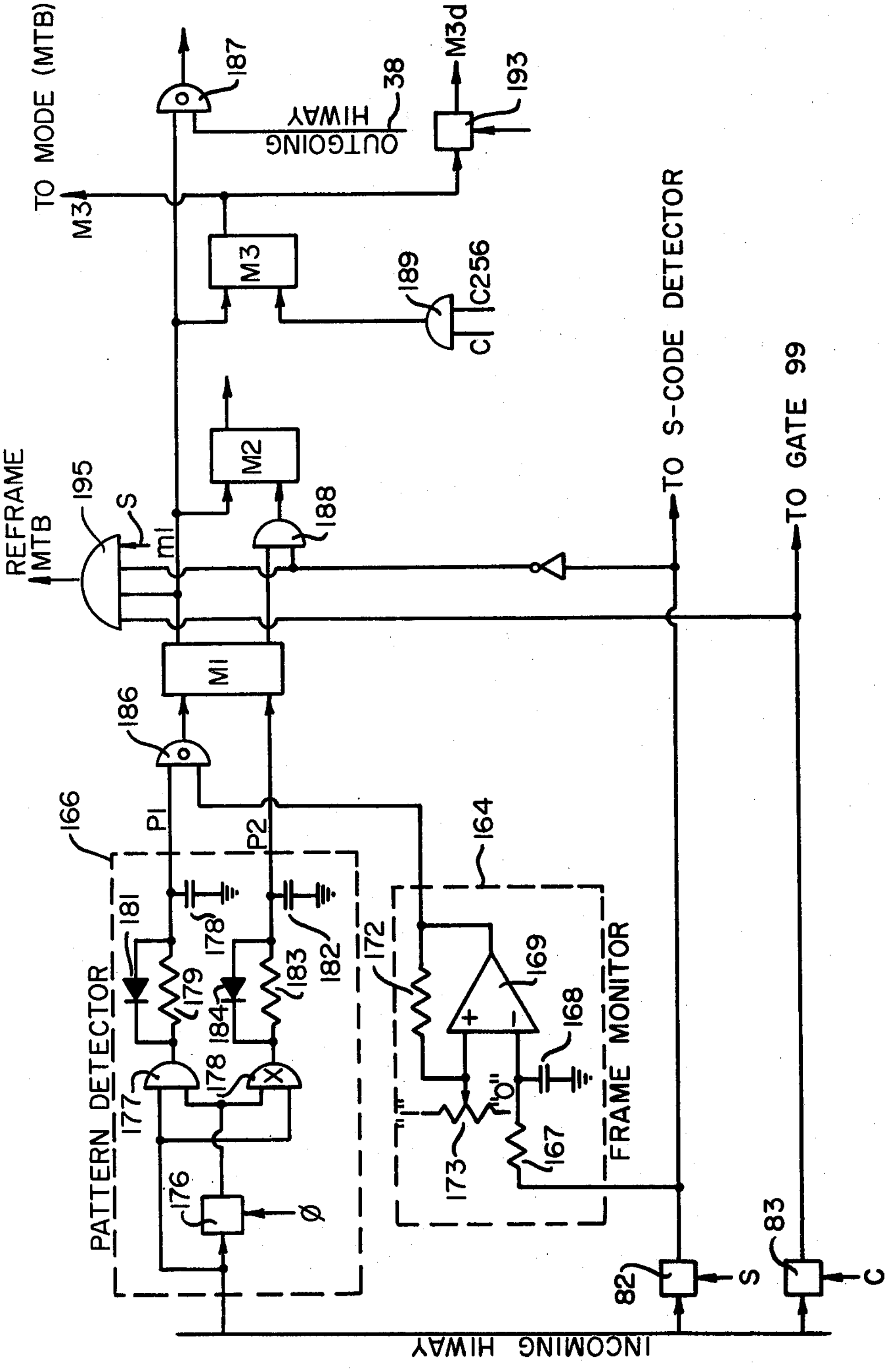
FIG. 18 shows the reframe logic of a remote terminal.

FIG. 18 shows reframing circuits at the remote terminal, including the frame monitor circuit shown in dotted block 164 and the pattern detector referred to previously shown in dotted block 166. The input signal to the frame monitor is the output of the demultiplexing shift cell 82, FIGS. 6, 9, 18, clocked by S pulse of the MTB. This input signal is integrated by an RC network 167, 168 and applied to the inverting input of comparison amplifier 169. The comparison voltage on the noninverting input of the amplifier is supplied by resistive voltage divider 172, 173 connected to the amplifier output.

The voltage across capacitor 168 is an averaged measure of the density of logic 0's in the input signal. Normally this density is very small, the capacitor voltage is high, and the amplifier output is logic 0. If the density of input 0's increases, the capacitor voltage falls below the comparison voltage and the amplifier output rises. This increases the comparison voltage and the amplifier output switches to logic 1. Subsequently, when the density of input 0's decreases, the capacitor voltage rises above the comparison voltage and the amplifier output falls. This decreases the comparison voltage and the amplifier output switches to logic 0. In the two directions, the comparison voltage is different. For inframe conditions, low density of logic 0's at monitor input, the logic 0 density must increase substantially to switch the amplifier output to logic 1. For misframed conditions, high density of logic 0's at monitor input, the logic 0 density must decrease substantially to switch the amplifier output to logic 0.

The input signal to the pattern detector 166 is the incoming bit stream. Shift cell 176, clocked by bit clock, provides a one bit delay. The input and output of shift cell 176 are applied to AND gate 177 and to exclusive OR gate 178. If the incoming bit stream is repeated logic 1's, the output of gate 177 is 1 and capacitor 178 charges slowly through resistor 179. For any logic 0 in the incoming bit stream, the output of gate 177 falls to logic 0 for two bit times and capacitor 180 discharges rapidly through diode 181. Thus, pattern detector output P1 will rise to logic 1 only if the input bit stream is logic 1 for a sustained interval. Any input logic 0 returns output P1 to logic 0.

If the incoming bit stream is alternating (0101---), the output of exclusive OR gate 178 is logic 1 and condenser 182 charges slowly through resistor 183. For any break in the alternating pattern (00 or 11), gate 178 output falls to logic 0 and condenser 182 discharges rapidly through diode 184. Thus, pattern detector output P2 will rise to logic 1 only if the input bit stream alternates for a sustained interval. Any break in the alternating pattern returns P2 to logic 0.

The output of the frame monitor 164 and the P1 output of the pattern detector 166 both connect to OR gate 186 which sets latch M1. Thus, latch M1 sets if the frame monitor detects a misframed condition or if the incoming bit stream is repeated logic 1's for a sustained interval. When latch M1 sets, it sets latches M2 and M3. When set, latch M1 applies logic 1 to OR gate 187 forcing the outgoing bit stream to be repeated logic 1's. It also disables AND gate 188 so that latch M2 cannot be cleared until latch M1 clears. When set, latch M3 applies logic 1 to the mode terminal of the MTB, forcing the MTB into the two-bit frame mode.

Additional functions of latches M2 and M3 are shown by the dotted connections in FIG. 9. When set, latch M2 applies logic 1 to the common clear terminal of the line counter 92 forcing the count to line 1. Latch M3 cannot be cleared via gate 189, FIG. 18, while latch M2 is set. Latch M3 operates transmission gates 191 and 192, FIG. 9, which transfer the line counter clock from binary divider 94 to the S pulse of the MTB. Latch M3 also clears the binary divider via gate 152.

The logic state of latch M3 is delayed one frame by shift cell 193 to provide a signal M3d (M3 delayed). In FIG. 9, M3d disables gate 98 so that gate 99 can repeat incoming C bits from shift cell 83 unaltered onto the outgoing highway. M3d also enables gate 151 via gate 194 to provide pulses to the load terminal of the local memory.

In the reframing procedure, the first phase established repeated 1's throughout the system transmission loop. In this phase, latch M1 has set, pattern detector output P1 is logic 1, and the frame monitor output is logic 0 because all incoming bits are logic 1. When the incoming bit stream changes to an alternating pattern, pattern detector output P1 falls to logic 0, and output P2 rises to logic 1, after a delay, to clear latch M1. If shift cells 82 and 83 register incoming logic 1 and logic 0, respectively, the MTB is in-frame. If shift cells 82 and 83 register incoming logic 0 and logic 1 respectively, the MTB is out-of-frame. If the first incoming logic 0 is clocked by S pulse, then shift cell 82 output falls to logic 0 and gate 195 output, enabled by M1, rises to logic 1. This applies logic 1 to the reframe terminal of the time base, FIG. 22 to be described, which sets shift cell 197 and clears shift cell 196. This terminates the current S pulse and starts a C pulse thereby shifting the time base on time slot to acquire frame. When the S pulse falls, it cancels the logic 1 output from gate 195. The rise of C pulse clocks the incoming logic 0 to the output of the shift cell 83, and gate 195 is now disabled by the incoming logic 0 C bits, terminating the reframe pulse.

With frame acquired, shift cell 82, FIG. 18, registers incoming logic 1's. Shortly thereafter, pattern detector output P2 rises to logic 1 and clears latch M1, disabling gate 195. Now a subsequent logic 0 on an incoming S bit cannot affect the MTB.

When M1 clears, it removes logic 1 from gate 187 and the outgoing bit stream is no longer repeated logic 1's. Latches M2 and M3 remain set. Incoming C bits, now logic 0, are repeated outgoing and the output bit stream is alternating. This establishes the second phase of the reframe procedure.

Subsequently, the remote terminal receives the roll-call generated by the control terminal. The roll-call start code is the first logic 0 on an incoming S bit. With latch M1 now clear, gate 188 is enabled, and the start code clears latch M2. When latch M2 clears, it removes logic 1 from the clear terminal of the line counter, FIG. 9. The line counter is then clocked through gate 192, advancing one count on each S pulse of the MTB. This provides address pulses sequentially to each cell of the local memory. Simultaneously, gate 151 is providing pulses to the memory load terminal, and incoming C bits, demutiplexed by shift cell 83, are applied to the memory input terminal. Thus, the local memory is loaded with roll-call information as previously described. Simultaneously, the roll-call is repeated outgoing to the next terminal because latch M3 is still set.

When the line counter reaches count 256, gate 189 of FIG. 18 is enabled and the following C pulse clears latch M3. This removes logic 1 from the mode terminal of the MTB, which now reverts from two bit frames to normal frames. When M3 clears, transmission gates 191 and 192, FIG. 9, return the line counter clock to binary divider 94, and the clear signal via gate 152 is removed. On the next S pulse, the divider output rises and normal line counting resumes. Also, M3*d* falls to logic 0, disabling gate 151 via gate 194 thereby terminating the memory load pulses. M3*d* also enables gate 98 so that normal loop scanning information can pass through gates 99 and 84 to C bits on the outgoing highway. The terminal is now completely normal and in-frame with its incoming bit stream.

In normal operation latches M1, M2 and M3 are all clear, and incidental clear pulses to these latches are of no consequence. Such incidental clear pulses occur whenever the normal bit stream happens to alternate for a sufficient interval (P2 rises to clear M1), whenever an incoming S bit is logic 0 (clears M2) or whenever the line counter passes count 256 (clears M3).

Figure 19:
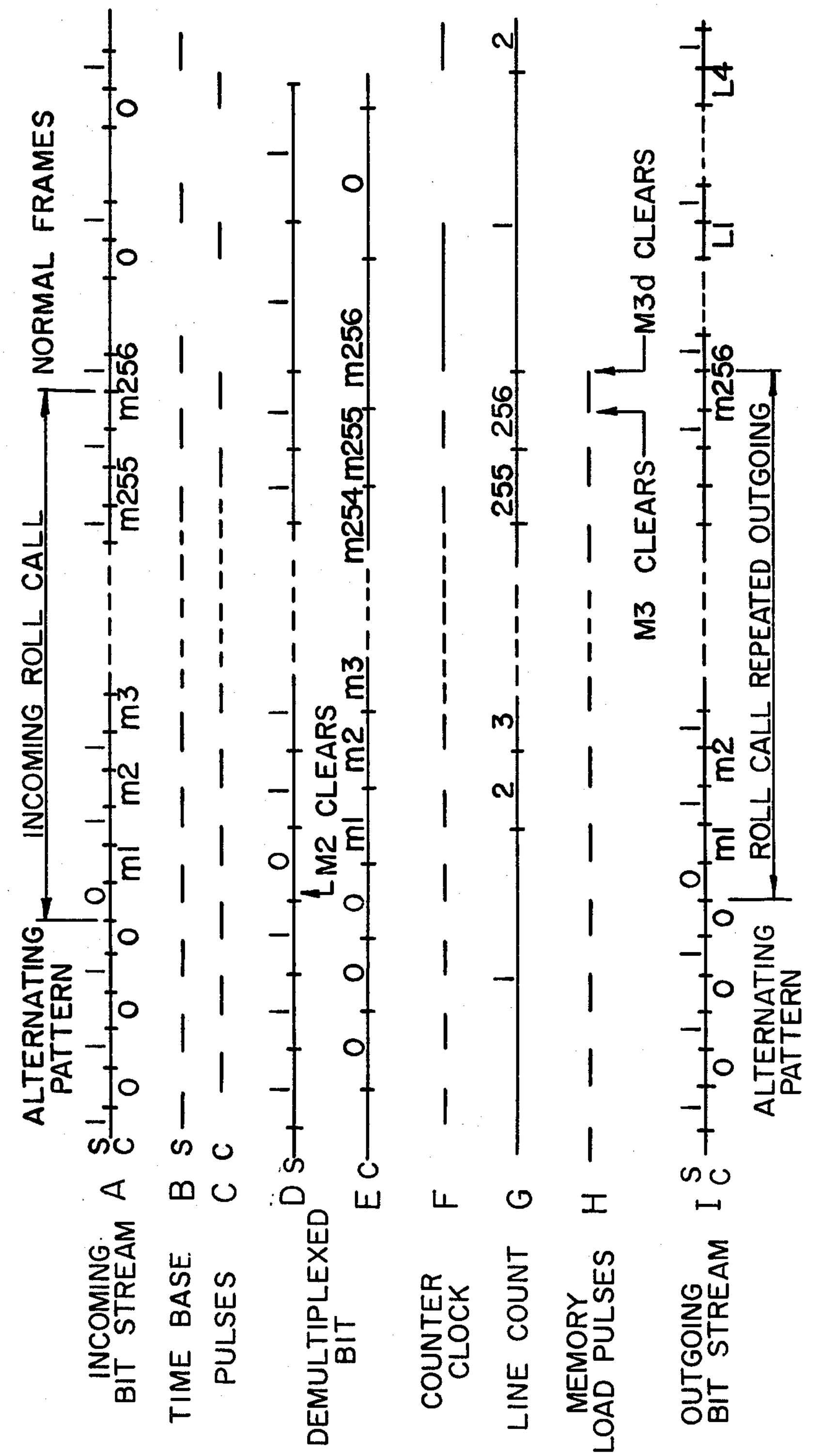
FIG. 19 shows the reframing timing details at a remote terminal.

Timing details of the roll-call phase of the reframing procedure are shown in FIG. 19. FIG. 19A shows the bit stream incoming to the remote terminal as the reframe procedure changes from the alternating phase to the roll-call phase to the normal frame structure. S bits and C bits are explicitly marked. In the roll-call interval the C bits carry the logic states of the 256 memory cells m1–m256 at the control terminal.

FIGS. 19B and 19C show the occurrence of S pulses and C pulses in the remote terminal MTB. FIGS. 19D and 19E show the demultiplexed information. FIG. 19F shows the occurrence of clock pulses to the line counter clock terminal, and FIG. 19G shows the current state of the line counter. FIG. 19H shows the occurrence of load pulses to the memory load terminal and FIG. 19I shows the bit stream outgoing from the remote terminal.

The first logic 0, FIG. 19D, clears latch M2, and thereby permits the line counter to start counting from count 1. The line count proceeds in synchronism with the demultiplexed C bits, FIG. 19E, which are applied to the memory input terminal. The memory load pulses cause the memory cells, FIG. 7, addressed sequentially by the line counter, to adopt the logic states applied to the memory input terminal 63.

When the line counter reaches count 256, the following C pulse clears latch M3 and the time base reverts to normal frame structure, the counter clock returns to its normal source, and the clear signal is removed from this source. On the next S pulse, M3*d* falls to logic 0 to terminate memory loading, and the normal counter clock rises to logic 1, advancing the line counter to count 1.

FIG. 19I shows the alternating pattern and roll-call repeated outgoing from the remote terminal. When normal frame structure is resumed, the outgoing C bits are marked with normal loop scan information, starting with line L1 as indicated on FIG. 19I.

Figure 20:
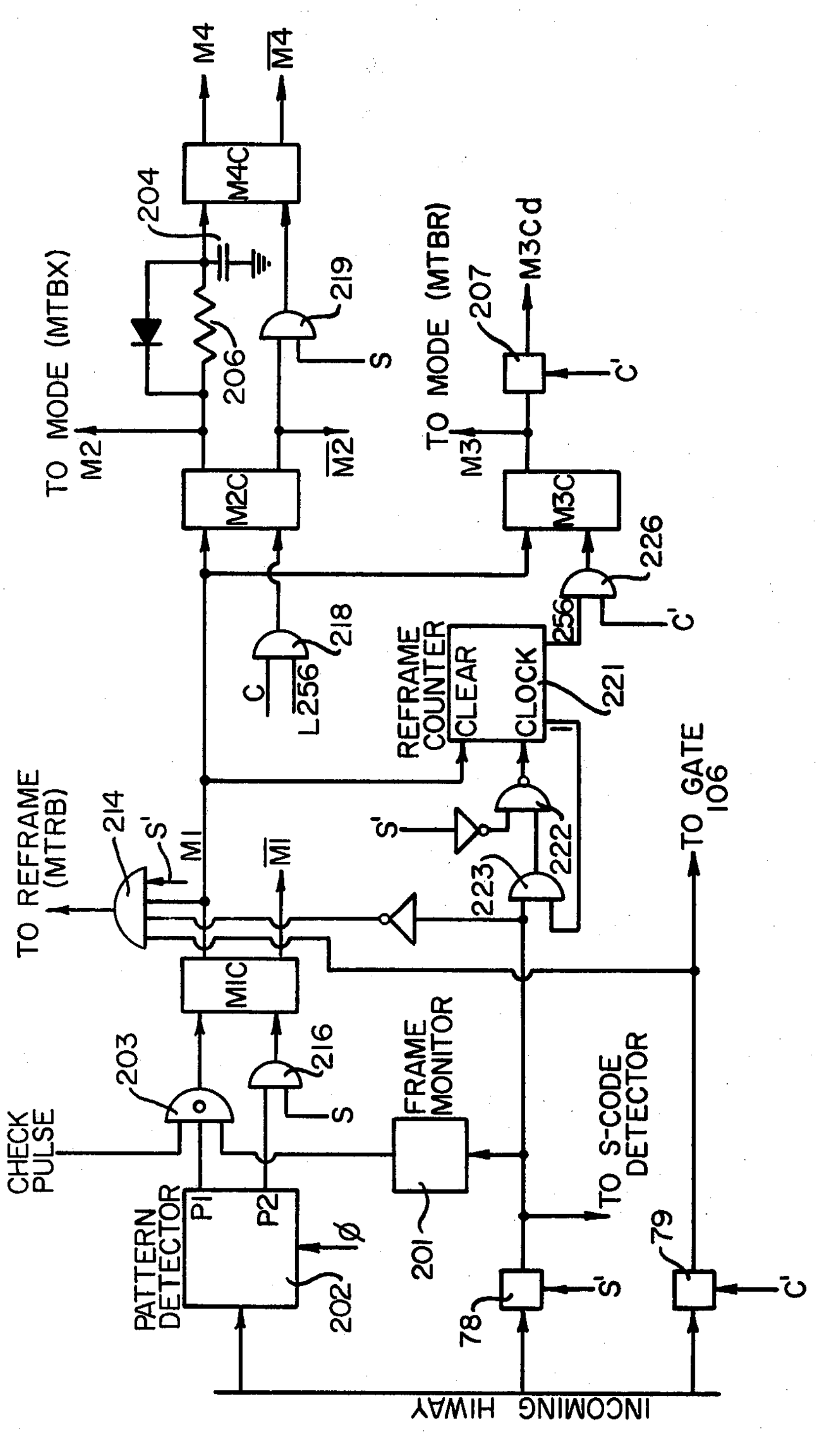
FIG. 20 shows the reframe logic at the control terminal.

FIG. 20 shows reframing circuits at the control terminal. The frame monitor circuit 201 and the pattern detector 202 are identical to those shown in FIG. 18. The output of the frame monitor and the P1 output of the pattern detector both connect to gate 203 which sets latch M1C. The third input to gate 203 is the error check pulse from gate 158, whose function was described in the section on traffic change procedure. This pulse will set M1C whenever a traffic change instruction contains an error after travelling around the system transmission loop.

When latch M1C sets, it sets latches M2C and M3C. When M2C sets, it charges capacitor 204 slowly via resistor 206. After time delay determined by capacitor 204 and resistor 206, the condenser voltage rises sufficiently to set latch M4C.

When set, latches M2C and M3C apply logic 1 to the mode terminals of the MTBX and MTBR, forcing both time bases into the two-bit frame mode. The logic state of M3C is detailed one frame by shift cell 207 to provide a signal M3C*d*.

Additional functions of the latches are shown by dotted connections in FIGS. 10 and 12. In FIG. 12 M3C*d* disables gate 136 to block pulses from the load terminal of the local memory. This preserves the current memory state. In FIG. 10 M3C*d*, via gate 156, conforms the receiving half of the memory and clears latch 109 so that the change counter remains held in state 1. M3C*d* also disables gate 108 to ensure that no set pulses can reach latch 109. Via gate 117, M3C holds binary divider 103 in the clear state. M2C operates transmission gates 208 and 209 to transfer the line counter 101 clock to S pulse of the MTBX. M1C clears the line counter, thereby forcing the scanning time base to count 1.

In FIG. 12, with M1C set and M4C clear, gate 211 applies logic 1 to gate 126, thereby forcing outgoing C bits to logic 1. With M1C set and M4Cc clear, gate 212 is disabled, gate 213 is disabled and the three inputs to gate 124 are all 0. Therefore, outgoing S bits are logic 1, and the bit stream emitted from the control terminal is repeated logic 1's. This is in accord with the first phase of the reframing procedure.

In due course, latch M4C sets, disabling gate 211. Now all three inputs to gate 126 are logic 0 and outgoing C bits are logic 0. Gate 213 remains disabled, so outgoing S bits remain logic 1. The bit stream emitted from the control terminal is an alternating pattern 0101 ---. This is in accord with the second phase of the reframing procedure.

As described previously, the alternating pattern circulates around the system transmission loop and each remote terminal acquires frame when the bit pattern changes from repeated logic 1's to alternating logic pattern. Similarly, at the control terminal the MTBR acquires frame, via gate 214, FIG. 20, when the incoming bit stream changes from repeated logic 1's to alternating logic pattern. Shortly thereafter, output P2 of the pattern detector rises to logic 1 and clears latch M1C via gate 216 coincident with the S pulse of MTBX.

With M1C clear, the line counter 101, FIG. 10, starts counting from count 1, clocked by S pulse of the MTBX. With M1C clear and M4C set, gate 212 is enabled. Gate 213 is enabled only while the line counter is on count 1. Gate 213 applies logic 1 to gate 124, thereby marking the outgoing S bit with logic 0. When the line counter advances from count 1, it disables gate 213, and subsequent S bits are marked logic 1. The single logic 0 S bit is the start code of the roll-call.

Gate 211 remains disabled, but gate 212, now enabled, enables gate 128 via gate 131. This provides a path from the memory scan highway to outgoing C bits via gates 134, 128, 126 and 74. As the line counter advances one count per frame, from count 1 to count 256, it scans the contents of the local memory, FIG. 8, onto the memory scan highway, and therefore onto outgoing C bits in sequential order. This provides the roll-call described in the reframing procedure.

With gate 212 enabled, the second input to gate 134 is logic 1 which causes logic inversion of the memory scan passing through it. Thus, there are two logic inversions between the memory scan and gate 74 and the memory scan is non-inverted when marked on outgoing C bits.

When the line counter reaches count 256, the following C pulse clears latch M2C via gate 218 of FIG. 20. This removes logic 1 from the mode terminal of MTBX and the bit stream outgoing from the control terminal reverts to normal frame structure. Latch M4C clears via gate 219 on the immediately following S pulse, disabling gate 212, FIG. 12. This disables gate 128 via gate 131, and all subsequent outgoing C bits are logic 0.

When M2C clears, transmission gates 208 and 209 of FIG. 10 operate to return the line counter to binary divider 103. But M3C is still holding the binary divider clear so the line counter stops and waits on count 256.

As described in the reframing procedure, the roll-call circulates around the system transmission loop and arrives back on the receiving side of the control terminal.

In FIG. 20, reframe counter 221 is clocked by S' pulse via gate 222. The counter has 256 counting states of which the first and last, states 1 and 256, are decoded to provide control signals. The counter clock is disabled via gate 223 whenever the count is at state 1 and the demultiplexed S bit, cell 78, is logic 1. Thus, the reframe counter normally rests on state 1.

When the roll-call arrives on the receiving side of the control terminal, the start code logic, 0 S bit, enables gate 222 via gate 223 and the reframe counter advances from state 1. On all subsequent counts gate 222 remains enabled because the state 1 output is logic 0. Thus, the reframe counter continues to count through all states, but stops when it reaches count 1 again.

When the reframe counter reaches count 256, the next C' pulse clears latch M3C via gate 226, FIG. 20. This removes logic 1 from the mode terminal of MTBR and the time base reverts to normal frame structure, synchronous with the arrival of normal frames following the roll-call.

When M3C clears, it removes the clear signal from binary divider 103, thereby restoring normal clock signal to the line counter which has been waiting on count 256. The line count advances to count 1 on the next C' pulse, synchronous with the incoming loop scan from remote terminals.

One frame later, signal M3Cd rises to logic 1, enabling gate 136, FIG. 12, and gate 108, FIG. 10. Thus, the first read pulse which can set latch 109 after a roll-call is the one which occurs when the line counter has advanced to count 1. The system is now completely normal.

In normal operation, latches M1C through M4C are all clear, so incidental clearing signals via gates 216, 218, 219 and 226 are of no consequence. In normal operation the reframe counter will start a counting sequence whenever an incoming S bit is logic 0. This is of no consequence because the reframe counter merely clears latch M3C which is already clear. To ensure that the reframe counter is resting on count 1 immediately before a roll call, the reframe counter is held clear while latch M1C is set. M1C clears before roll-call, enabling the reframe counter to start counting when the start code arrives.

Figure 21:
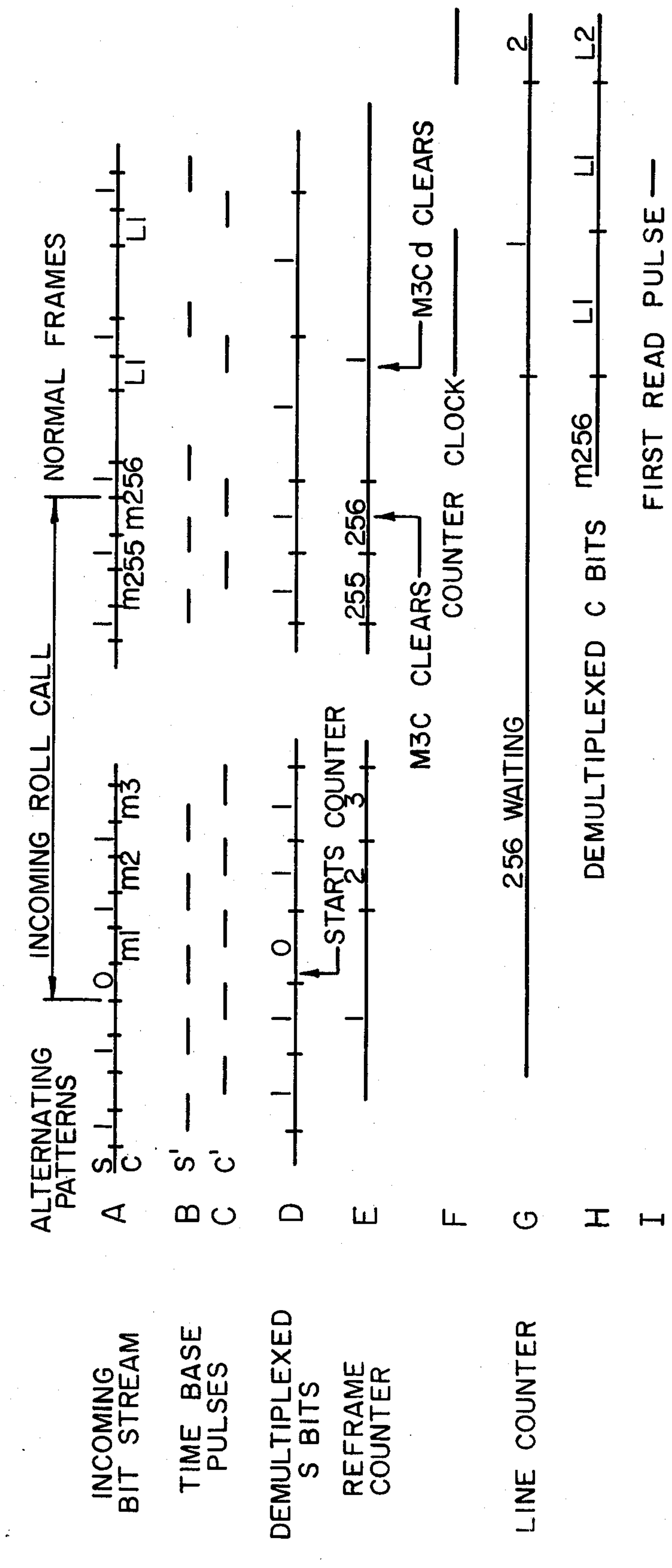
FIG. 21 shows the reframing timing detail at the control terminal.

Timing details of the roll-call phase of the reframing procedure are shown in FIG. 21. FIG. 21A shows the bit stream incoming to the control terminal from the last remote terminal, as the reframe procedure changes from alternating phase to the roll-call phase to the normal frame structure. S bits and C bits are marked. FIGS. 21B and 21C show the occurrence of S' pulses and C' pulses in the MTBR. FIG. 21D shows the demultiplexed S bits. FIG. 21E shows the current state of the reframe counter. It rests in count 1 until the start code of the roll-call permits it to start counting. It then counts through its sequence and stops again on count 1. On count 256, the next C′ pulse clears M3C, and the time base reverts to normal frame structure. When M3C clears, it enables the binary divider which normally supplies clock to the line counter. The clock signal, FIG. 21F, rises on the next C′ pulse and advances the line counter, FIG. 21G, from count 256 to count 1. The line counter is now synchronous with the demultiplexed incoming loop scan shown in FIG. 21H. M3C*d* falls to logic 0 one frame after M3C clears. This enables gate 108 and the first read pulse which can set latch 109 is shown at FIG. 21I.

Message Time Base

Figure 22:
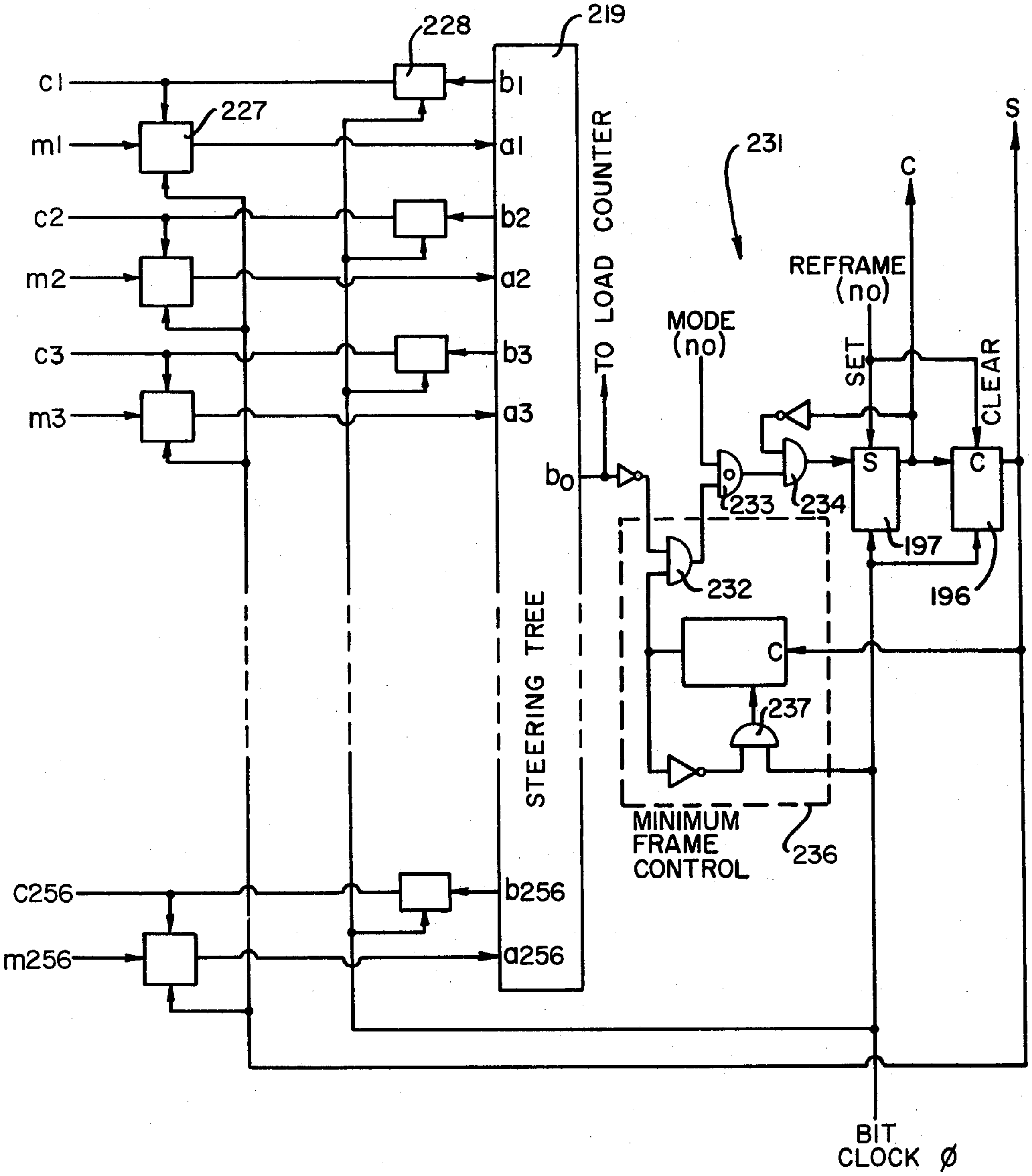
FIG. 22 shows the message time base circuit.

The message time bases for the control terminals and the remote terminals each consist of two ranks of shift cells 227, 228, a logic steering tree 229, and other logic 231 to be described, FIG. 22. The first rank of shift cells 227 has its inputs, *m*1 to *m*256, connected to the outputs of the corresponding local memory, FIGS. 7 and 8, and its outputs connected to the inputs, *a*1 to *a*256, of the steering tree 229. The second rank of shift cells 228 has its inputs connected to the outputs, *b*1 to *b*256, of the steering tree 229 and its outputs, *c*1 to *c*256, connected to the clear terminals of the first rank of shift cells. These outputs also provide the line clock pulses for corresponding multiplexing gates 72, 80 and demultiplexing shift cells 76, 81 of FIGS. 5 and 6. The second rank of shift cells is clocked by the terminal bit clock $\phi$, $\phi'$. The first rank of shift cells is clocked by a pulse, designated S, generated periodically by shift cell 196.

The steering tree performs the following logic function. When all of its inputs, *a*1 to *a*256, are logic 0, then all of its outputs, *b*0 and *b*1 -*b*256, are logic 0. If any of its inputs are logic 1, then output *b*0 is logic 1, and one, and only one, other output, *b*1 to *b*256, is logic 1. This other output is the *b* terminal corresponding to the first input *a* terminal which is logic 1. Thus, for example, if there are ten input terminals marked logic 1 and the first of these is *a*5, then terminal *b*5 will be logic 1. No other *b* terminal will be logic 1, except *b*0. The internal circuitry of the steering tree will be described presently. At the end of a message frame all shift cells of the first rank have output logic 0. Therefore, all inputs *a* and all outputs *b* of the steering tree are logic 0. The next frame starts with the rise of the S pulse generated by shift cell 196.

For specificity, assume the local memory provides logic 1 on terminals *m*5, *m*8, *m*20 --- *m*215, logic 0 on the others. When the S pulse rises, on the rise of bit clock, the *m* inputs are clocked through the first rank of shift cells and appear on the inputs to the steering tree. Thus *a*5, *a*8, *a*20, etc. become logic 1. *b*0 becomes logic 1 and *b*5 becomes logic 1. All other *b*'s remain logic 0. On the next rise of bit clock *c*5 becomes logic 1, which clears the fifth cell in the first rank and *a*5 then becomes logic 0. Then *b*5 becomes logic 0 and *b*8 becomes logic 1. On the next rise of bit clock, *c*5 becomes logic 0 and *c*8 becomes logic 1, which clears the eighth cell in the first rank and *a*8 becomes logic 0. Then *b*8 becomes logic 0 and *b*20 becomes logic 1. On the next rise of bit clock, *c*8 becomes logic 0 and *c*20 becomes logic 1, which clears the 20th cell in the first rank and *a*20 becomes logic 0. Then *b*20 becomes logic 0 and the next *b* having *a* logic 1 becomes 1, etc.

The process continues as described until the clock pulse on output lead *c*215 rises, which clears the 215th cell in the first rank and *a*215 becomes logic 0. Then *b*215 becomes logic 0 and, because all *a*'s are now logic 0, *b*0 also becomes logic 0. This applies 1 to the input of shift cell 197 via gates 232, 233 and 234. On the next rise of bit clock *c*215 becomes logic 0, and the output of cell 197 rises to logic 1 generating a C pulse which disables gate 234. On the next rise of bit clock, the output of cell 197 falls to logic 0 and the output of cells 196 rises to logic 1. Thus, the C pulse ends and the S pulse rises to start a new frame. The rising edge of S pulse clocks the first rank of shift cells 227, *b*0 becomes logic 1 and disables gate 234 via gates 232 and 233. Then the input to cell 197 remains logic 0 until all of the inputs to the steering tree have been cleared to logic 0.

Thus, in the complete cycle we have generated one S pulse which started the frame, a set of sequential pulses on the line clock leads of active subscriber lines, and one C pulse which ended the frame.

In FIG. 22 the minimum frame control 236 contains a binary counter with decode to generate logic 1 on an output terminal when the counter reaches a predetermined count, for example, 30. The counter is cleared to count 1 by the S pulse which starts the time base frame. It then advances one count for every cycle of bit clock, clocked via gate 237. When the counter reaches count 30, counting stops because gate 237 is disabled by the counter output. During the count-up period, gate 232 is disabled and prevents the *b*0 output of the steering tree from reaching shift cell 197 to generate a C pulse. When the counter reaches count 30 and stops, gate 232 is enabled and logic 0 on *b*0 can reach shift cell 197 to generate a C pulse to end the frame.

Thus, the minimum frame control guarantees that there will be at least thirty time slots between the S pulse which starts a frame and the C pulse which ends a frame. For example, if only five of the *m* inputs from memory are logic 1, then the time base will generate a sequence of five pulses on the corresponding line clock leads, then wait for an additional 25 time slots before generating the C pulse. Conversely, if forty of the *m* inputs from memory are logic 1, then the time base will generate a sequence of 40 pulses on the corresponding line clock leads, followed immediately by a C pulse from shift cell 197.

During the frame sequence described above, steering tree output *b*0 rose to logic 1 at the start of the frame and fell to logic 0 at the start of the least line clock pulse. Thus, the duration of the *b*0 pulse is equal to the number of line clock pulses generated by the time base. The *b*0 pulse can be used to gate a counter which records the number of message channels in a time base frame, i.e. the current traffic load on the system.

Thus, the message time base provides the system with elastic, full-availability, non-blocking switching of lines to trunks. In the transmission frames, each interior time slot of the frame represents a separate transmission channel, i.e. trunk. The time base assigns lines to trunks by providing clock pulses to the line equipment as described above. The switch is elastic because the time base varies the frame length, i.e. number of trunks, to provide a trunk for each requesting line. The switch blocks, i.e. denies a trunk to a requesting line, only when the frame length has reached a maximum limit determined by the setting of the maximum load counter. Below this limit the switch is full-availability and non-blocking because every requesting line is assigned a trunk regardless of existing assignments. This is in contrast to conventional switching equipment which may have limited availability (i.e. not all lines can reach all trunks), or may block a requesting line from an available trunk because of congestion, due to current assignments, in the links between multiple stages of the switch.

In FIG. 22, the terminal marked "mode" provides means for forcing the time base into a two-bit frame mode. If the mode terminal is logic 1, it enables gate 234 via gate 233. Then cell 197 acts as a binary divider generating C pulses at half the rate of the bit clock. Cell 196 repeats these with one cycle delay. Thus, the time base simply generates two-bit frames consisting of one S pulse and one C pulse interleaved in time. This process continues until the mode terminal returns to logic 0.

In FIG. 22 the terminal marked "reframe" is normally logic 0, inactive. A pulse on this lead will force shift cells 197 and 196 to set and clear respectively, thereby placing the time base in a known phase relationship with respect to the reframe pulse. This reframe function is used only during the system reframing procedure described above.

The logic function of the steering tree was described previously. To repeat: if all inputs, *a*1 to *a*256, are logic 0, then all outputs, *b*0 and *b*1 to *b*256, are logic 0. If any input is logic 1, output *b*0 is logic 1 and one, and only one, other *b* output is logic 1. This other output is the *b* terminal corresponding to the first *a* terminal which is logic 1.

Figures 23, 24:
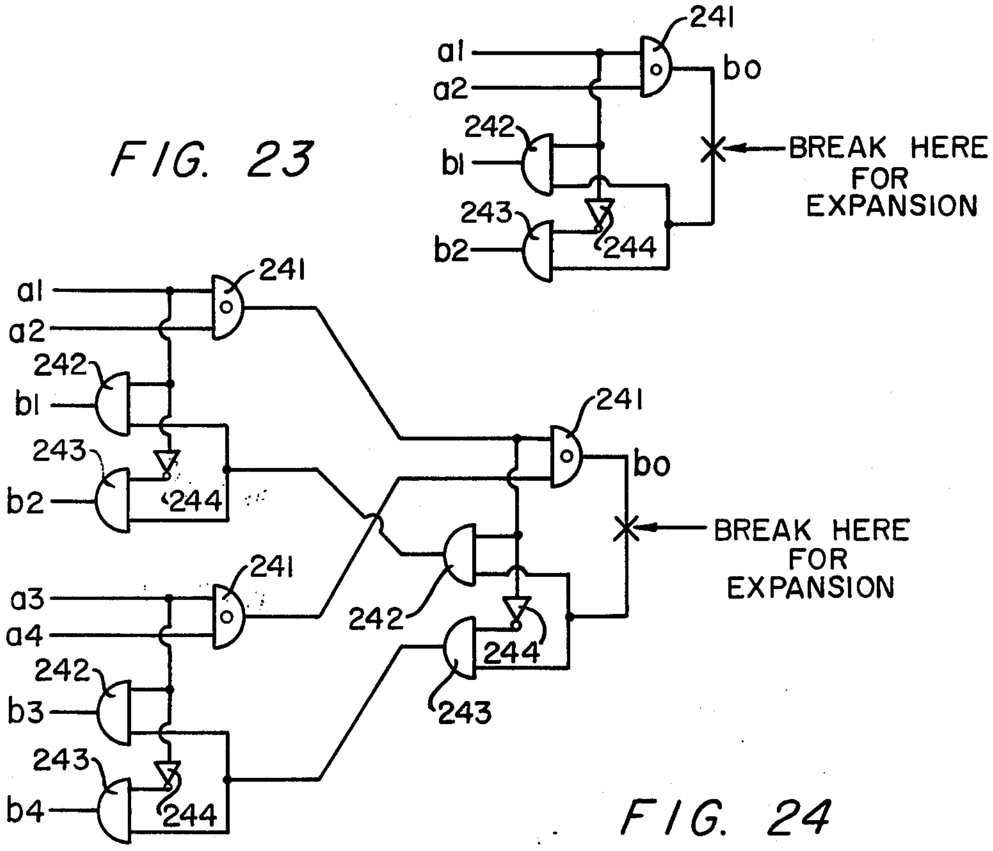
FIG. 23 shows a two port logic circuit used in forming a steering tree.
FIG. 24 shows a four port steering tree formed by combining three two port logic circuits.

An N-port steering tree can be constructed in a tree configuration of elementary two-port logic blocks. FIG. 23 shows a two-port logic circuit of one OR gate 241, two AND gates 242, 243, and a logic inverter 244. The logic rules of each of these logic element are as follows:

| OR Gate | | AND Gates | | Inverter | |
|---|---|---|---|---|---|
| Inputs | Outputs | Inputs | Outputs | Inputs | Outputs |
| 1 1 | 1 | 1 1 | 1 | 1 | 0 |
| 1 0 | 1 | 1 0 | 0 | 0 | 1 |
| 0 1 | 1 | 0 1 | 0 | | |
| 0 0 | 0 | 0 0 | 0 | | |

The overall logic function of the combination follows from the consideration of the logic rules of the individual elements. Note that there is a single output (logic 1) at the *b* terminal corresponding to the first input *a* terminal marked with logic 1. If both inputs are marked logic 0, terminal *b*0 is logic 0 and the output at the *b* terminals is logic 0. The logic rule for the two-port logic circuit is as follows:

Two-Port Steering Tree

| Inputs | | Outputs | | |
|---|---|---|---|---|
| $a_1$ | $a_2$ | $b_0$ | $b_1$ | $b_2$ |
| 1 | X | 1 | 1 | 0 |
| 0 | 1 | 1 | 0 | 1 |
| 0 | 0 | 0 | 0 | 0 |

where X indicates 0 or 1.

FIG. 24 shows a four-port steering tree constructed by combining three two-port logic circuits in tree configuration. The overall logic function of the four-port circuit follows from consideration of the logic functions of the two-ports. Note that there is a single output (logic 1) at the *b* terminal corresponding to the first input *a* terminal marked with logic 1, and if all inputs are marked logic 0, then terminal *b*0 is logic 0 and all the *b* terminals have logic 0. The logic rules for the four-port tree are as follows:

Four-Port Steering Tree

| Inputs | | | | Outputs | | | | |
|---|---|---|---|---|---|---|---|---|
| $a_1$ | $a_2$ | $a_3$ | $a_4$ | $b_0$ | $b_1$ | $b_2$ | $b_3$ | $b_4$ |
| 1 | X | X | X | 1 | 1 | 0 | 0 | 0 |
| 0 | 1 | X | X | 1 | 0 | 1 | 0 | 0 |
| 0 | 0 | 1 | X | 1 | 0 | 0 | 1 | 0 |
| 0 | 0 | 0 | 1 | 1 | 0 | 0 | 0 | 1 |
| 0 | 0 | 0 | 0 | 0 | 0 | 0 | 0 | 0 |

where X indicates 0 or 1.

In similar manner the tree configuration of two ports can be extended to provide a steering tree of many ports with the overall logic function remaining the same. There is a single output (logic 1) at the *b* terminal corresponding to the first input *a* terminal marked with logic 1. When all inputs are marked logic 0, then terminal *b*0 is logic 0 and the output *b* terminals are all logic 0.

The foregoing description has illustrated the application of the system to provide telephone service between a central office and many individual subscriber lines grouped at one or more remote terminals. It could also be used to provide interoffice telephone trunks between a hub central office and one or more tributary offices. In this application, the control terminal of FIG. 1 would be installed at the hub central office and the remote terminals would be installed at the tributary offices. Each set of subscriber lines would be replaced by a trunk group between the hub central office and the tributary offices. The system line interface units would be modified to provide for trunk circuit signalling functions rather than subscriber line signalling functions.

I claim:

1. A multi-channel carrier system interconnecting a plurality of communication lines at a control terminal with corresponding communication lines at one or more remote terminals by means of transmission channels in which said terminals include means forming sequential frames of message time slots, each message time slot constituting a transmission channel for a communications line, and means responsive to the active or idle status of communication lines for controlling the number of message time slots in each frame so that message time slots are provided only for active communication lines and the frame rate varies in accordance with the number of message time slots in each frame.

2. A multi-channel carrier system as in claim 1 in which said terminals include means for adding or deleting message time slots in said frames as communication lines become active or idle respectively.

3. A multi-channel carrier system as in claim 1 in which said terminals include means for adding a framing time slot to each frame.

4. A multi-channel carrier system as in claim 2 in which said means for adding or deleting message time slots is responsive to the active or idle status of communication lines at the control terminal or at the remote terminals to add a message time slot whenever either the control end or remote end of a communications line becomes active, or to delete a message time slot whenever both the control end and the remote end of a communications line become idle.

5. A multi-channel carrier system as in claim 2 in which said means for adding or deleting message time slots includes means at the control terminal for sensing the active or idle state of communication lines at the control terminal and providing information relative thereto, means at the remote terminals for sensing the active or idle state of communication lines at the remote terminals to transmit information relative thereto to the control terminal, means at the control terminal responsive to said information from the remote and control terminals for adding a message time slot to the system whenever either the control end or remote end of a communications line becomes ative, or for deleting a message time slot from the system whenever both the control end and the remote end of a communications line becomes idle.

6. A multi-channel carrier system as in claim 1 in which said terminals include means for sensing when the message time slots do not interconnect corresponding communication lines at the control and remote terminals and generating a misframe signal and means responsive to said misframe signal for reframing the system whereby the message time slots interconnect corresponding communication lines at the control and remote terminals.

7. A multi-channel carrier system as in claim 5 in which the active or idle state of each communication line at the control and remote terminals is sensed sequentially by a scanning system which advances one line every two frames of time slots.

8. A multi-channel carrier system comprising a control terminal, one or more remote terminals, and an interconnecting transmission medium providing transmission between a plurality of communication lines connected to the control terminal and a corresponding number of communication lines connected to the remote terminal, said transmission being provided by transmission channels in transmission frames in which said control terminal includes means for sensing when a communication line requires a transmission channel, means responsive to the sensing of a requirement for a transmission channel to form transmission channels in said frame only for those communication lines requiring transmission channels whereby said transmission frames include only channels corresponding to communication lines requiring transmission channels with a frame rate corresponding thereto.

9. A multi-channel carrier system as in claim 8 in which said control terminal includes means for adding or deleting transmission channels as communication lines become active or idle respectively.

10. A multi-channel carrier system as in claim 8 in which said means for sensing when a communication line requires a transmission channel includes means for sensing a requirement either by a communication line at the control terminal or a communication line at the remote terminal.

11. A multi-channel carrier system as in claim 8 in which said terminals include means for sensing when assigned transmission channels do not interconnect corresponding active communication lines at the control and remote terminals and means responsive to said sensing means for reassigning the transmission channels so that corresponding communication lines at the control and remote terminals are interconnected.

12. A transmission system providing transmission channels between a plurality of communication lines connected to a control terminal and corresponding communication lines connected to one or more remote terminals including a transmission medium between the communication lines at said control terminal and the communication lines at said one or more remote terminals and means forming sequential frames of message time slots constituting transmission channels and applying said frames of message time slots to said transmission medium, said last named means responsive only to active communication lines for providing message time slots whereby the number of message time slots per frame is equal to the number of active communication lines and the frame rate varies in accordance with the number of message time slots.

13. A transmission system as in claim 12 wherein said means for forming sequential frames of message time slots constituting transmission channels includes means for adding to each frame a frame time slot for delineating the frame and a control time slot for transmitting control signals.

14. A transmission system as in claim 12 including means at the remote terminal for sensing whether a communication line is active or idle and transmitting information relative thereto over the control time slot to the control terminal, means at said control terminal for sensing whether communication lines connected to said control terminal are active or idle and providing information relative thereto and means at the control terminal responsive to the control and remote terminals information serving to add a transmission channel to the system whenever either the control end or the remote end of a communications line becomes active, or to delete a transmission channel from the system whenever both the control end and the remote end of a communication line becomes idle.

15. A transmission system as in claim 12 including means at the terminals for limiting the minimum number of time slots in any frame.

16. A transmission system as in claim 15 in which said control terminal includes means for limiting the maximum number of time slots in any frame.

17. A transmission system as in claim 12 including means for detecting when the message time slots do not interconnect corresponding communication lines at the control and remote terminals to form a misframe signal, said means responsive to said misframe signal for reframing the system whereby the message time slots interconnect corresponding communication lines at the control and remote terminals.

18. A transmission system as in claim 17 wherein during reframing the system reverts to a two time-slot frame to reframe the system in said two time-slot mode.

19. A multi-channel carrier system interconnecting a plurality of communication lines at a control terminal with corresponding communication lines at one or more remote terminals by means of transmission channels in which each of said terminals includes means forming sequential frames of message time slots, each message time slot constituting a transmission channel for a communications line, and means at the control terminal responsive to the active or idle status of communication lines at the control terminal or at the remote terminals for controlling the number of message time slots in each frame so that message time slots are provided only for active communication lines and the frame rate varies in accordance with the number of time slots.

20. A multi-channel carrier system as in claim 19 in which said terminals include means for adding a message time slot whenever either the control end or remote end of a communications line becomes active, or to removing a message time slot whenever both the control end and the remote end of a communications line becomes idle.

21. A multi-channel subscriber carrier system for connecting a plurality of subscriber line appearances at a central office to corresponding remote subscriber lines comprising a control terminal connected to said central office line appearances, one or more remote terminals connected to said subscriber lines and a transmission medium interconnecting said control terminal and said one or more remote terminals, means in said control terminal for sensing when a subscriber line is active, means responsive to sensing of an active subscriber line to provide transmission channels only for active subscriber lines which occupy one time slot in sequential frames of time slots transmitted over said transmission medium to complete transmission channels between the subscriber lines at the remote terminal and the corresponding line appearances at the central office, said frame length and rate being dependent upon the number of active lines.

22. A subscriber carrier system as in claim 21 wherein said control terminal includes means providing a framing time slot at the beginning of said frame for identifying frames of time slots and a control time slot at the end of said frames for transmitting control information between the control and remote terminals.

23. A multi-channel system of the type described for providing transmission between a plurality of communication lines connected to a control terminal and corresponding communication lines connected to one or more remote terminals over a transmission medium interconnecting said control and remote terminals, said control terminal including a plurality of control terminal line interface units, one connected to each communication line to receive information therefrom and supply information thereto, each of said line units including an encoder serving to encode said received information for transmission to said remote terminal and a decoder for decoding encoded information received from said remote terminal, a plurality of transmission gates one connected to the output of each encoder for multiplexing the encoded information onto said transmission medium, a transmit memory having a plurality of memory cells, one for each communication line, each of said cells adapted to be marked active or idle corresponding to the current state of the associated communication line, a transmitting message time base having a plurality of inputs one connected to each of said memory cells and a plurality of corresponding outputs one connected to each of said encoders and corresponding transmission gates, said message time base serving to generate recurring frames of sequential clock pulses of one time slot duration on the outputs corresponding to the active memory cells only, each clock pulse serving to clock the encoder and transmission gate of the associated line interface unit, said sequential clock pulses serving to multiplex the encoded information onto said transmission medium a plurality of receiving gates one for each communication line connected to the transmission medium to receive information from the remote terminals, a receive memory having a plurality of memory cells one for each line, each of said cells adapted to be marked identical to the cells of the transmit memory, a receiving message time base having a plurality of inputs one connected to each of said receive memory cells and a plurality of corresponding outputs one connected to each corresponding receiving gate, said receiving time base serving to generate recurring frames of sequential clock pulses on the outputs corresponding to the active memory cells only, each clock pulse serving to clock an associated recurring gate, said sequential clock pulses serving to demultiplex incoming coded information on said transmission medium and apply the same to an associated decoder which decodes the information and applies its output to the corresponding communication line;

said one or more remote terminals each including:

a plurality of remote terminal line interface units connected to each communication line of said remote terminals to receive information therefrom and supply information thereto, each of said line units including an encoder serving to encode received information for transmission over said transmission medium to the control terminal and a decoder for decoding information received from said transmission medium, a plurality of transmission gates one connected to the output of each encoder for multiplexing the encoded information onto said transmission medium, a plurality of receiving gates one for each communication line connected to the transmission medium to receive information from the transmission medium, a memory having a plurality of memory cells one for each line, each of said cells adapted to be marked identical to the cells of the transmit memory, a message time base having a plurality of inputs one for each memory cell of the communication lines associated with said terminal and a plurality of corresponding outputs one connected to the encoder and the transmission and receiving gates of the corresponding line units, said message time base serving to sequentially generate recurring frames of sequential clock pulses of one time slot duration on the outputs corresponding to an active memory cell only, each clock pulse serving to clock the encoder and transmission gate of an associated line unit, said sequential clock pulses serving to multiplex the encoded information onto said transmission medium, said clock pulses also serving to clock associated receiving gates, said sequetial clock pulses serving to demultiplex incoming information from said transmission medium and apply the same to an associated decoder which decodes the information and applies its output to the corresponding communication line at the remote terminal.

24. A multi-channel system as in claim 22 in which said plurality of communication lines connected to the control terminal comprise subscriber line appearances at a central office and the corresponding communication lines connected to the one or more remote terminals correspond to subscriber lines.

25. A multi-channel system as in claim 23 including traffic control means, means in said time base for generating a framing clock pulse of one time slot duration to the beginning of each of said recurring frames of sequential clock pulses, a transmission gate connected to said traffic control means serving to multiplex framing information onto said transmission medium, and means in said time base for generating a control clock pulse of one time slot duration at the end of each of said recurring frames of sequential clock pulses and a transmission gate connected to said traffic control means serving to multiplex control information onto said transmission medium responsive to said control clock pulse.

26. A multi-channel system as in claim 25 in which the remote terminal line units include means indicating the status of the associated communication lines, means at the remote terminal for sequentially scanning the line units to generate a status signal corresponding to the status of the associated communication line, means at the remote terminal responsive to said control clock pulses to multiplex the status information onto said transmission medium, means at the control terminal for demultiplexing the incoming status information from the remote terminals on said transmission medium, means at the control terminal for sequentially scanning the status of each communication line at the control terminal, means for combining said remote line status information and control terminal line status information and providing an active line scan signal if one or both line status information is active and an idle line scan signal if both are idle, means for scanning the control terminal transmit memory and forming a transmit memory signal indicating the idle or active status of the corresponding memory cell, means for comparing said line scan signal with the transmit memory signal forming a traffic change signal when only one is active or idle, and means responsive to the traffic change signal for adding a message time slot if the line scan signal is active and the memory scan is idle and means for deleting a time slot if the line scan signal is idle and the memory scan is active.

27. A communication system as in claim 26 in which said sequential scanning means includes a line counter and decoder.

28. A communication system as in claim 27 in which said traffic change signal stops the control terminal line counter at the count of the line requiring change, generates a change instruction and multiplex the change instruction in the frame and control message time slots for transmission to the remote terminals, said change instructions identifying the subscriber line and the required change.

29. A communication system as in claim 28 in which said remote terminals include means for receiving the change instruction, means responsive to receipt of complete change instruction for resetting the remote terminal line counter to the corresponding count, and means for conforming the corresponding remote terminal memory cell to the instruction to mark the memory cell idle or active.

30. A communication system as in claim 28 wherein said means for instructing the remote terminals comprises sending the binary code identifying the memory cell to be changed in successive control time slots.

31. A communication system as in claim 23 in which said control and remote terminals each include means for sensing when the incoming framing pulses do not coincide with the local framing pulses whereby to generate a misframe signal.

32. A communication system as in claim 31 including means responsive to the misframe signal for forcing the time base into a two-bit frame mode and emitting a sequence of logic bits of one type, means at each of the other terminals responsive to said logic bits of one type for forcing each of said terminals in turn into a two-bit frame mode and emitting said one logic state, means at the control terminal for generating two-bit frame with alternating logic after a predetermined time, and means at the remote terminals responsive to said two-bit mode for framing said remote terminals and transmitting a two-bit frame with alternating logic, and means at the control terminal responsive to the two-bit alternating logic frame pattern for transmitting a roll call consisting of a plurality of two-bit frames one frame for each of the communication lines associated with the carrier system to address and conform the memory cells at each of the remote terminals and at the receiving portion of the control terminal.

33. A transmission system as in claim 23 in which said control terminal transmitting message time base includes means for limiting the minimum number of time slots in any frame.

34. A transmission system as in claim 23 in which said control terminal transmitting message time base includes means for limiting the maximum number of time slots in any frame.

35. A multi-channel system of the type described for providing transmission between a plurality of communication lines connected to a control terminal and corresponding communication lines connected to one or more remote terminals over a transmission medium interconnecting said control and remote terminals, said control terminal including:

a plurality of control terminal interface units, one connected to each communication line to receive information therefrom and supply information thereto, each of said line interface units including a delta modulation encoder serving to encode said received information for transmission to said remote terminal and a delta modulation decoder for decoding encoded information received from said remote terminal, a plurality of transmission gates one connected to the output of each encoder for multiplexing the encoded information onto said transmission line, means for generating recurring frames of sequential transmitting clock pulses of one time slot duration for each active communication line with the frame rate dependent upon the number of time slots, each clock pulse serving to clock the encoder and transmission gate of an associated line interface unit to multiplex the encoded information onto said transmission medium as frames of encoded information, a plurality of receiving gates one for each communication line connected to the transmission medium to receive information from the remote terminal, means for generating recurring frames of sequential receiving clock pulses for each active line, each clock pulse serving to clock an associated receiving gate to demultiplex incoming coded information on said transmission medium and apply the same to an associated decoder which decodes the information and applies its output to the corresponding line;

said one or more remote terminals including:

a plurality of remote terminal line interface units connected to each communication line of said remote terminal to receive information therefrom and supply information thereto, each of said line units including a delta modulation encoder serving to encode received information for transmission to the control terminal over said transmission medium and a delta modulation decoder for decoding information received from the control terminal over said transmission medium, a plurality of transmission gates one connected to the output of each encoder for multiplexing the encoded information onto said transmission line medium, a plurality of receiving gates one for each communication line connected to the transmission medium to receive information on the transmission medium, means for generating recurring frames of sequential clock pulses of one time slot duration on the output corresponding to an active communication line with the frame rate dependent upon the number of time slots, each clock pulse serving to clock the encoder and transmission gate of an associated line interface unit to multiplex the encoded information onto said transmission medium as frames of encoded information, said clock pulses also serving to clock associated receiving gates to demultiplex incoming information on said transmission medium and apply the same to an associated decoder which decodes the information and applies it to the corresponding communication line at the remote terminal.

36. A multi-channel system as in claim 35 including means at the control terminal for sensing the active or idle state of communication lines connected to the control terminal and providing information relative thereto, means at the remote terminals for sensing the active or idle state of communication lines connected to the remote terminals to transmit information relative thereto to the control terminal, means at the control terminal responsive to said information from the remote and control terminals for adding a message time slot to the system whenever either the control end or remote end of a communications line becomes active, or deleting a message time slot from the system whenever both the control end and the remote end of a communications line becomes idle.

37. A multi-channel system as in claim 35 in which said terminals include means for sensing when the message time slots do not interconnect corresponding communication lines at the control and remote terminals and generating a misframe signal and means responsive to said misframe signal for reframing the system whereby the message time slots interconnect corresponding communication lines at the control and remote terminals.

38. A multi-channel system as in cliam 36 in which the active or idle state of each communication line at the control and remote terminals is sensed sequentially by a scanning system which advances one line every two frames of time slots.

39. A multi-channel system as in claim 35 in which said means for generating transmitting clock pulses includes means for limiting the minimum number of clock pulses in any frame.

40. A multi-channel system as in claim 35 in which said means for generating transmitting clock pulses includes means for limiting the maximum number of clock pulses in any frame.

41. A multi-channel system of the type described for providing transmission between a plurality of communication lines connected to a control terminal and corresponding communication lines connected to one or more remote terminals over a transmission medium interconnecting said control and remote terminals, said control terminal including;

a plurality of control terminal line interface units, one connected to each communication line to receive information therefrom and supply information thereto, each of said line interface units including a delta modulation encoder serving to encode said receive information for transmission to said remote terminal and a delta modulation decoder for decoding information received from said remote terminal, multiplexing means serving to multiplex the encoded information of active communication lines onto said transmission medium as sequential frames of sequential message time slots, said frames including one time slot for each active line and said sequential frames having a frame rate which varies with the number of time slots in each frame, means for demultiplexing incoming sequential frames of sequential message time slots and applying the same to the respective decoders connected to the communication lines for providing messages to the respective communication line, said one or more remote terminals each including:

a plurality of remote terminal line interface units connected to each communication line of said one or more remote terminals to receive information therefrom and supply information thereto, each of said line units including a delta modulation encoder serving to encode received information for transmission over said transmission medium to the control terminal and a delta modulation decoder for decoding information received from said transmission medium, multiplexing means serving to multiplex the encoded information of active communication lines onto said transmission mediums as sequential frames of sequential message time slots, said frames including one time slot for each active line and said sequential frames having a frame rate which varies with the number of time slots in each frame, and demultiplexing means for demultiplexing incoming sequential frames of sequential message time slots and applying same to the respective decoders connected to the associated active communication line.

42. A multi-channel carrier system as in claim 41 in which said system includes means for adding or deleting message time slots as communication lines become active or idle respectively.

43. A multi-channel carrier system as in claim 41 in which said multiplexing means includes means for adding a framing time slot for each frame.

44. A multi-channel carrier system as in claim 41 in which said terminals include means for sensing when the message time slots do not interconnect the corresponding communication lines at the control and remote terminals to generate a misframe signal, and means responsive to said misframe signal for reframing the system whereby the message time slots interconnect corresponding communication lines at the control and the remote terminals.

45. The method of transmitting information between a plurality of communication lines connected to a control terminal and corresponding communication lines connected to one or more remote terminals over a transmission medium interconnecting said control terminal and one or more remote terminals which includes sensing the state of said communication lines, encoding the messages on the active lines at the control and at the remote terminals, multiplexing said encoded messages onto said transmission medium as sequential frames of sequential message time slots with time slots only for encoded messages of active lines for transmission between the control and remote terminals whereby the frame rate varies with the number of time slots for active lines, demultiplexing the incoming sequential frames of sequential message time slots at the control and at the remote terminals, decoding the demultiplexed messages and applying them to the corresponding active communication lines.

46. The method of transmitting information as in claim 45 including the step of sensing when communication lines become active or idle and adding or deleting message time slots from said frames of sequential message time slots whereby the number of message time slots corresponds to the number of active lines.

47. The method of transmitting information as in claim 46 including the step of sensing when there is a misframe and reframing the system.

* * * * *